US009094397B2

(12) United States Patent
Mueck

(10) Patent No.: US 9,094,397 B2
(45) Date of Patent: *Jul. 28, 2015

(54) RADIO DEVICES, REGULATION SERVERS, AND VERIFICATION SERVERS

(71) Applicant: Intel Mobile Communications GmbH, Neubiberg (DE)

(72) Inventor: Markus Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,337

(22) Filed: Jun. 4, 2014

(65) Prior Publication Data
US 2014/0287719 A1    Sep. 25, 2014

Related U.S. Application Data

(63) Continuation of application No. 13/219,745, filed on Aug. 29, 2011, now Pat. No. 8,779,890, which is a continuation-in-part of application No. 13/006,464, filed on Jan. 14, 2011, now abandoned.

(51) Int. Cl.
*H04M 1/66* (2006.01)
*H04W 24/00* (2009.01)
(Continued)

(52) U.S. Cl.
CPC .......... *H04L 63/0876* (2013.01); *H04L 63/107* (2013.01); *H04W 8/22* (2013.01); *H04W 12/06* (2013.01); *H04W 8/245* (2013.01); *H04W 24/00* (2013.01)

(58) Field of Classification Search
CPC .............. H04L 63/0876; H04L 63/107; H04L 12/2697; H04L 43/50; H04L 9/3273; H04L 2463/101; H04L 63/0823; H04W 12/06; H04W 8/22; H04W 8/245; H04W 8/24; H04W 24/02; H04W 24/04; G06F 21/35; G06F 2211/003; G06Q 20/4093

USPC ........... 340/5.2, 5.8, 5.86, 539.1, 7.24, 572.1, 340/572.8, 10.1, 825.17; 380/30, 258, 285, 380/277, 282; 455/422, 426, 427, 461, 465, 455/67, 67.4, 517, 436, 552, 411, 423, 455/67.11, 67.14, 418
See application file for complete search history.

(56) References Cited

U.S. PATENT DOCUMENTS

2002/0017702 A1    2/2002    Fjelstad
2002/0107702 A1    8/2002    Diehl
(Continued)

FOREIGN PATENT DOCUMENTS

CN    1489299 A    4/2004
CN    1757028 A    4/2006
(Continued)

OTHER PUBLICATIONS

Directive 1999/5/EC of the European Parliament and of the Council of Mar. 9, 1999, p. 10-28, http://eur-lex.europa.eu/LexUriServ/LexUriServ.do?uri=CELEX:31999L0005:en:NOT.
FCC Rules on FOSS and Software-Defined-Radio, Software Freedom Law Center, Jul. 6, 2007, pp. 1-4, http://www.softwarefreedom.org/resources/2007/fcc-sdr-whitepaper.html, 6 pages.
Cognitive Radio Technologies and Software Defined Radios, Federal Communications Commission, 47 CFR Part 2, Federal Register Jun. 6, 2007 (vol. 72, No. 108), pp. 31190-31192, http://edocket.access.gpo.gov/2007/07-1684.htm, 6 pages.
(Continued)

*Primary Examiner* — Mirza Alam
(74) *Attorney, Agent, or Firm* — Schwabe, Williamson & Wyatt, P.C.

(57) ABSTRACT

According to various embodiments, a radio device may be provided. The radio device may include a configurable component, a configuration information transmitter configured to transmit information identifying the radio device and an identifier of a configuration of the configurable component to a regulation server; and a permission information receiver configured to receive from the regulation server information indicating as to whether the radio device is permitted to use the configuration of the configurable component or as to whether a pre-determined configuration of the configurable component is to be used by the radio device.

19 Claims, 9 Drawing Sheets

(51) Int. Cl.
*H04B 17/00* (2006.01)
*G05B 19/00* (2006.01)
*H04L 29/06* (2006.01)
*H04W 8/22* (2009.01)
*H04W 12/06* (2009.01)
*H04W 8/24* (2009.01)

(56) References Cited

U.S. PATENT DOCUMENTS

| | | | |
|---|---|---|---|
| 2002/0137514 A1* | 9/2002 | Mitsugi et al. | 455/436 |
| 2003/0099358 A1 | 5/2003 | Michael et al. | |
| 2003/0100297 A1* | 5/2003 | Riordan et al. | 455/418 |
| 2004/0049561 A1 | 3/2004 | Tafazolli et al. | |
| 2005/0182802 A1* | 8/2005 | Beaudou et al. | 708/200 |
| 2005/0185792 A1* | 8/2005 | Tokutani et al. | 380/30 |
| 2005/0272419 A1* | 12/2005 | Matsuo et al. | 455/423 |
| 2006/0099965 A1 | 5/2006 | Aaron | |
| 2007/0019769 A1 | 1/2007 | Green et al. | |
| 2007/0116292 A1* | 5/2007 | Kurita et al. | 380/270 |
| 2007/0230356 A1* | 10/2007 | Kalantri et al. | 370/241 |
| 2008/0305784 A1 | 12/2008 | Dillinger et al. | |
| 2008/0311866 A1* | 12/2008 | Roux et al. | 455/127.1 |
| 2009/0067367 A1 | 3/2009 | Buracchini et al. | |
| 2009/0257345 A1* | 10/2009 | King | 370/216 |
| 2012/0182120 A1 | 7/2012 | Mueck | |

FOREIGN PATENT DOCUMENTS

| | | | |
|---|---|---|---|
| CN | 101077024 A | 11/2007 | |
| CN | 102594387 A | 7/2012 | |
| CN | 102595393 A | 7/2012 | |
| DE | 102004049706 A1 | 4/2006 | |
| DE | 102012100307 A1 | 7/2012 | |
| EP | 1397015 B1 | 1/2007 | |
| EP | 1761085 A1 | 3/2007 | |
| WO | 0197069 A2 | 12/2001 | |

OTHER PUBLICATIONS

Office action notification date Dec. 18, 2012 in related U.S. Appl. No. 13/219,745, filed Aug. 29, 2011, 59 pages.
European Search Report received for EP Patent Application No. 11179188.5, mailed Feb. 27, 2012, 8 pages.
Office action received for European Patent Application No. 11179188.5, mailed on Aug. 28, 2013, 6 pages.
Office action received for German patent Application No. 102012100297.5, mailed on Dec. 6, 2013, 26 pages.
Office action received for China Patent Application No. 20120009558.7, mailed on Dec. 3, 2013, 12 pages of Office action and 24 pages of English Translation.
Office action received in German Patent Application No. 102012100307.6 mailed Jun. 12, 2013, 43 pages.
This application is a continuation of U.S. Appl. No. 13/219,745, filed Aug. 29, 2011, which is a continuation-in-part of U.S. Appl. No. 13/006,464, filed Jan. 14, 2011, all of which are hereby incorporated by reference in their entirety.
Office action received fro China Patent Apliication No. 20120009558.7, mailed Jan. 30, 2014, 21 pages.
1999/5/EC R&TTE Directive, http://ec.europa.eu/enterprise/sectors/rtte/index_en.htm.
European Patent Office; Extended European Search Report for European Patent App. No. 14175763.3; mailed Sep. 19, 2014; 10 pages.
United States Patent and Trademark Office; Office Action for U.S. Appl. No. 13/006,464 mailed Nov. 20, 2012; 51 pages.
Chinese Patent Office; Second Office Action for Chinese App. No. 201210009558.7 issued Jun. 26, 2014; 29 pages inclusive of English translation.
Chinese Patent Office; Third Office Action for Chinese App. No. 201210009558.7 issued Oct. 29, 2014; 10 pages inclusive of English translation.
Chinese Patent Office; Second Office Action for Chinese App. No. 201210009533.7 issued Oct. 20, 2014; 13 pages inclusive of English translation.

* cited by examiner

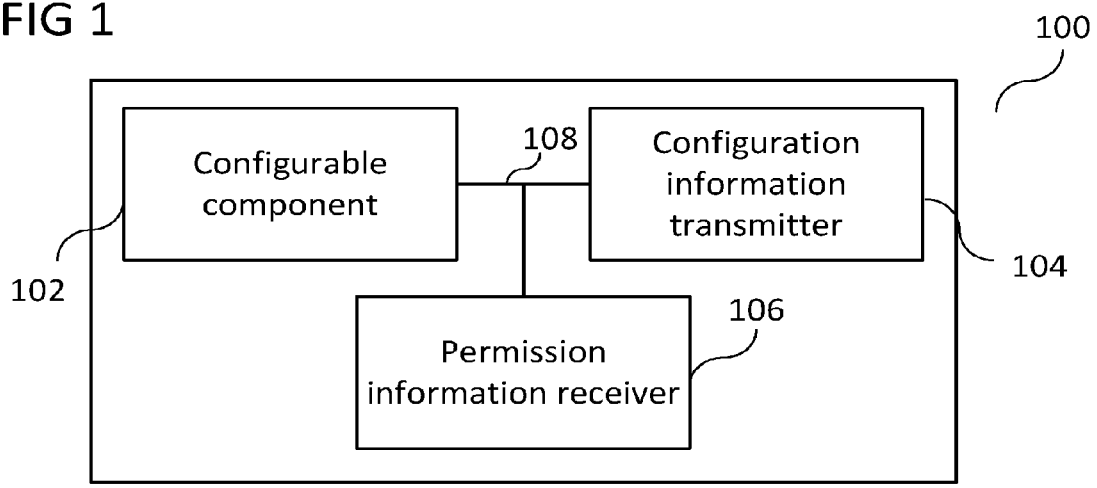
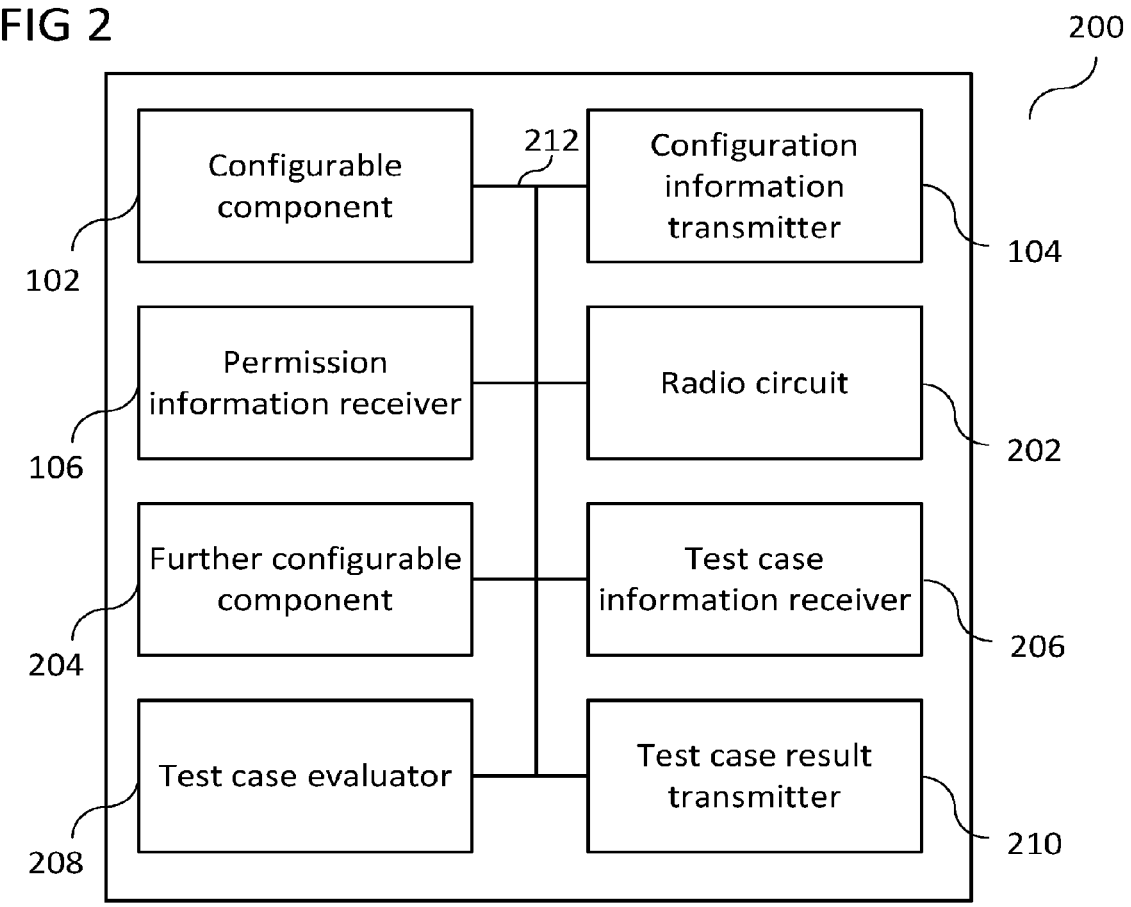

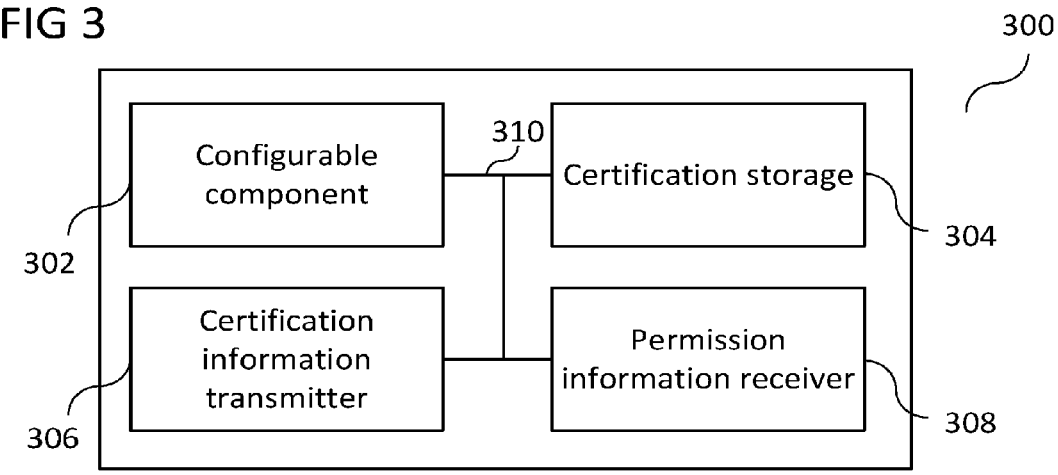
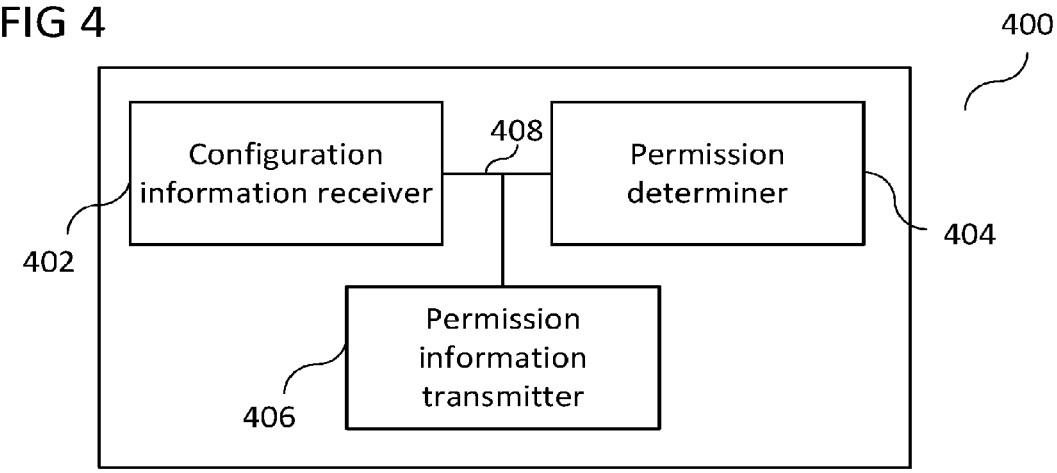

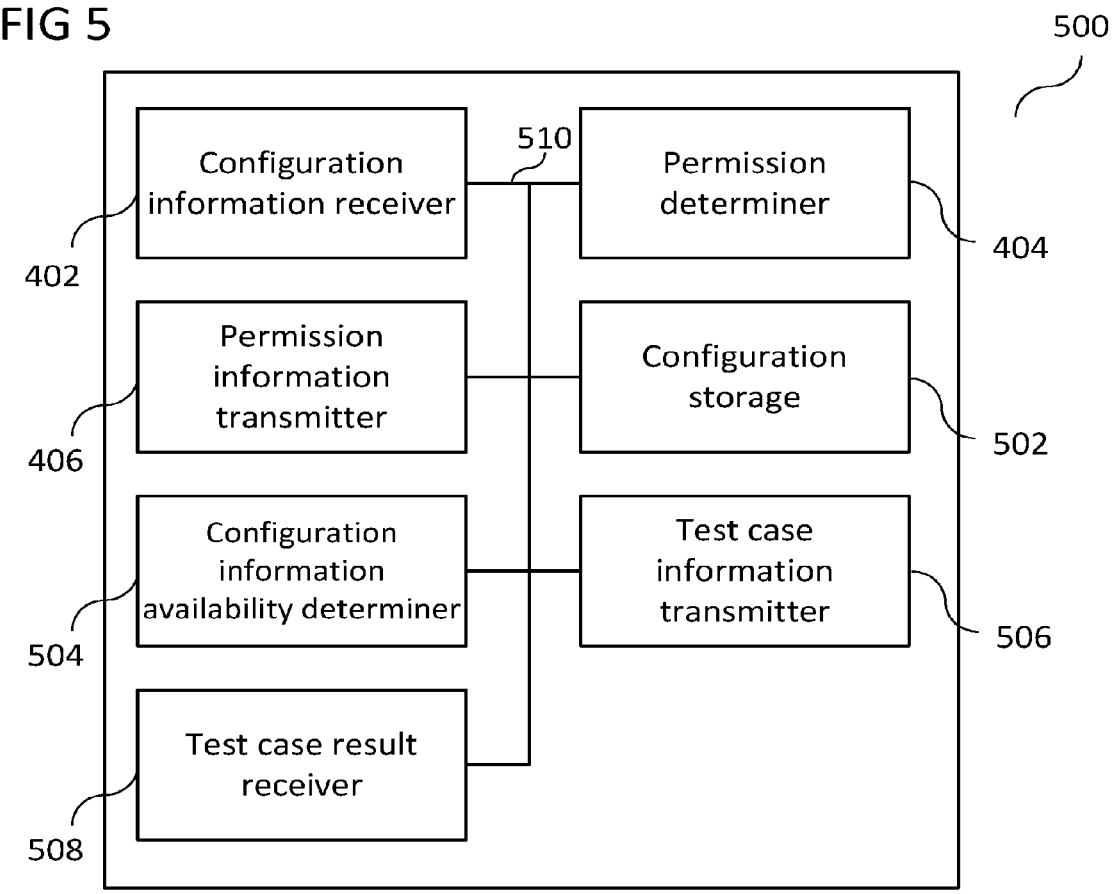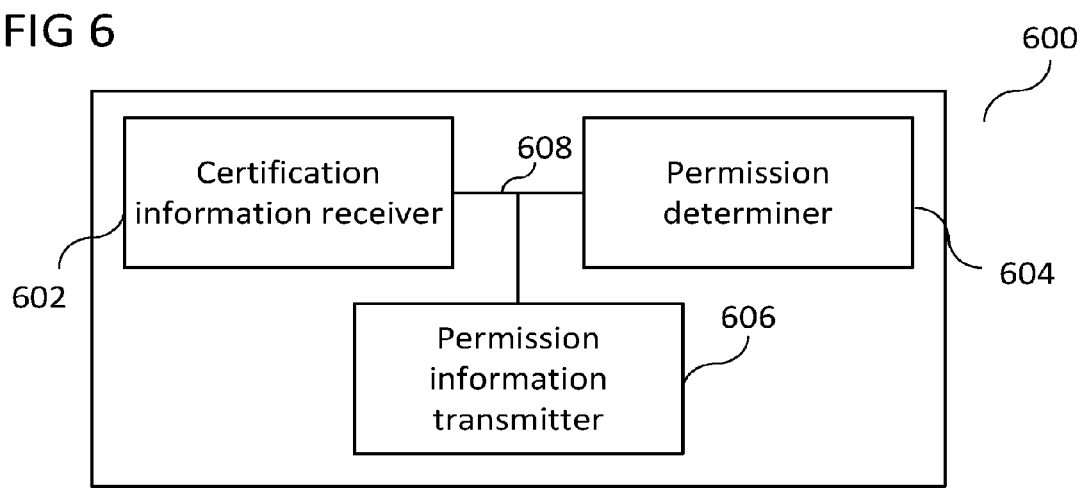

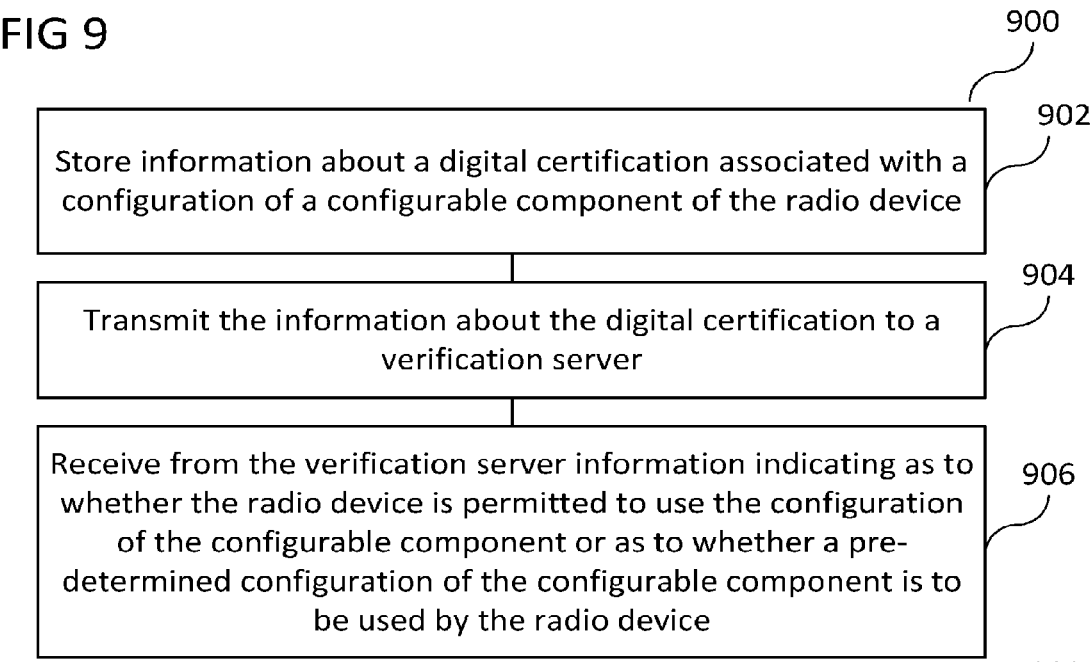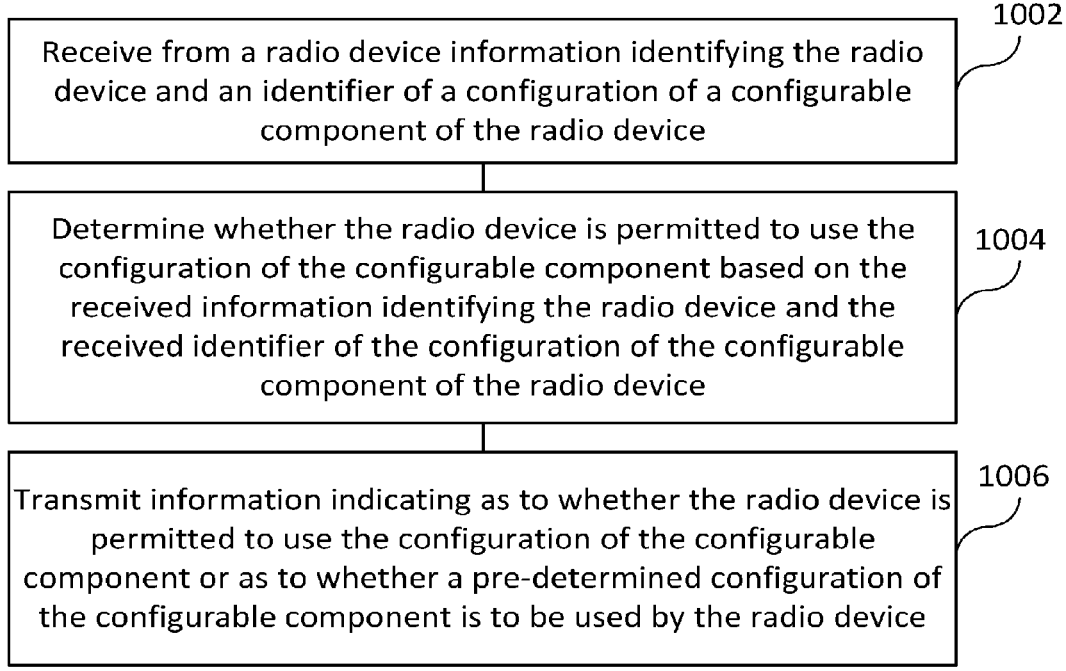

RADIO DEVICES, REGULATION SERVERS, AND VERIFICATION SERVERS

RELATED APPLICATIONS

This application is a continuation of U.S. patent application Ser. No. 13/219,745 filed on Aug. 29, 2011, which is a continuation-in-part of U.S. patent application Ser. No. 13/006,464 filed on Jan. 14, 2011, the contents and disclosures of which are hereby incorporated by reference in their entireties.

TECHNICAL FIELD

Embodiment relate generally to radio devices, regulation servers, and verification servers.

BACKGROUND

Usually, a radio device that is operated may be desired to fulfill certain requirements in order to be allowed to be operated in a specific country or region. Usually, this certification is provided by tests performed by the manufacturer or distributor of the radio device before delivering the radio device to the customers, and information related to the certification is printed on the radio device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 1 shows a radio device in accordance with an embodiment;

FIG. 2 shows a radio device in accordance with an embodiment;

FIG. 3 shows a radio device in accordance with an embodiment;

FIG. 4 shows a regulation server in accordance with an embodiment;

FIG. 5 shows a regulation server in accordance with an embodiment;

FIG. 6 shows a verification server in accordance with an embodiment;

FIG. 9 shows a flow diagram illustrating a method for controlling a radio device in accordance with an embodiment;

FIG. 10 shows a flow diagram illustrating a method for controlling a regulation server in accordance with an embodiment;

DESCRIPTION

Figure 7:
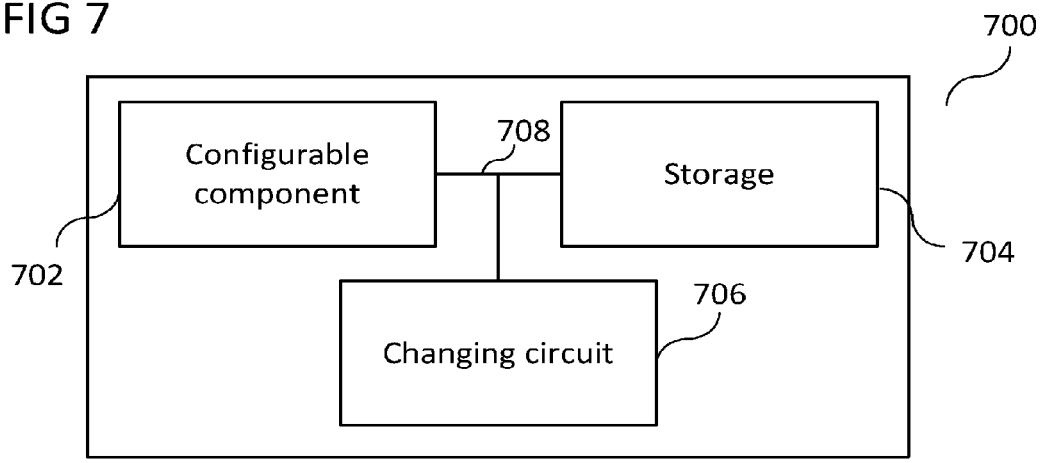
FIG. 7 shows a radio device in accordance with an embodiment.

Usually, a radio device that is operated may be desired to fulfill certain requirements in order to be allowed to be operated in a specific country or region. Usually, this certification is provided by tests performed by the manufacturer or distributor of the radio device before delivering the radio device to the customers, and information related to the certification is printed on the radio device. According to various embodiments, radio device and servers may be provided for dynamic and digital certification, in the case where properties of the radio device may be changed.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

A radio device according to various embodiments may be any device that can use radio to transmit and/or receive information. According to various embodiments, a radio device may be a wireless device. According to various embodiments, a radio device may be a mobile device. For example, a radio device may be a device configured for wireless communication. In various embodiments, a radio device may be a mobile radio communication device, and a mobile radio communication device may be an end-user mobile device (MD). In various embodiments, a mobile radio communication device may be any kind of mobile telephone, personal digital assistant, mobile computer, or any other mobile device configured for communication with a mobile communication base station (in other words: with a base station (BS)) or an access point (AP) and may be also referred to as a User Equipment (UE), a mobile station (MS) or an advanced mobile station (advanced MS, AMS), for example in accordance with IEEE 802.16m. According to various embodiments, a radio device may be a base station, a NodeB, a home base station, a home NodeB, a pager, a radio receiving apparatus, a walkie-talkie, an interference transmitter, a jammer transmitter, a remote control, a television station or a radio station.

According to various embodiments, a radio device may be configured according to at least one of the following radio access technologies: a Bluetooth radio access technology, an Ultra Wide Band (UWB) radio access technology, a Wireless Local Area Network radio access technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio access technology, a General Packet Radio Service (GPRS) radio access technology, an Enhanced Data Rates for GSM Evolution (EDGE) radio access technology, and/or a Third Generation Partnership Project (3GPP) radio access technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, and Unlicensed Mobile Access (UMA, also referred to as 3GPP Generic Access Network, or GAN standard)).

It will be understood that any property for a specific radio device may also hold for any other radio device.

It will be understood that certification information, for example a digital certification, according to various embodiments may include or may be digital and/or dynamic DoC (declaration of conformity) ID and/or digital and/or dynamic CE marking ID and/or a digital and/or dynamic alert sign and/or information indicating compliance with a DoC and/or information indicating compliance with a CE marking and/or information indicating compliance with an alert sign. An alert sign may be a sign indicating that a device for which the sign is provided may not be operated in all possible configurations of the device (in other words: in all possible configurations of a configurable component of the device) in all countries.

A radio device may include a memory which may for example be used in the processing carried out by the radio device. A regulation server may include a memory which may for example be used in the processing carried out by the regulation server. A verification server may include a memory which may for example be used in the processing carried out by the verification server. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

FIG. 1 shows a radio device 100 in accordance with an embodiment. The radio device 100 may include a configurable component 102, a configuration information transmitter 104 configured to transmit information identifying the radio device 100 and an identifier of a configuration of the configurable component 102 to a regulation server (not shown, for example a regulation server like described below with reference to FIG. 4 and FIG. 5); and a permission information receiver 106 configured to receive from the regulation server information indicating as to whether the radio device 100 is permitted to use the configuration of the configurable component 102 or as to whether a pre-determined configuration of the configurable component 102 is to be used by the radio device 100. The configurable component 102, the configuration information transmitter 104, and the permission information receiver 106 may be coupled with each other, e.g. via an electrical connection 108 such as e.g. a cable or a computer bus or via any other suitable electrical connection to exchange electrical signals.

According to various embodiments, information indicating as to whether the radio device 100 is permitted to use the configuration of the configurable component 102 or as to whether a pre-determined configuration of the configurable component 102 is to be used by the radio device 100 may be provided in the form of certification information, for example a positive certification or a negative certification.

According to various embodiments, information indicating as to whether the radio device is permitted to use the configuration of the configurable component 102 or as to whether a pre-determined configuration of the configurable component is to be used by the radio device may be provided in the form of certification information, for example a positive certification or a negative certification.

It will be understood that "using a configuration" may mean being operating in the configuration or working in the configuration.

According to various embodiments, the radio device 102 may include or may be at least one of a base station, a NodeB, a home base station, a home NodeB, a mobile radio communication device, a user equipment, a pager, a radio receiving apparatus, a walkie-talkie, an interference transmitter, a jammer transmitter, a remote control, a television station and a radio station.

FIG. 2 shows a radio device 200 in accordance with an embodiment. The radio device 200 may, similar to the radio device 100 of FIG. 1, include a configurable component 102, a configuration information transmitter 104, and a permission information receiver 106. The radio device 200 may further include a radio circuit 202, like will be described in more detail below. The radio device 200 may further include a further configurable component 204, like will be described in more detail below. The radio device 200 may further include a test case information receiver 206, like will be described in more detail below. The radio device 200 may further include a test case evaluator 208, like will be described in more detail below. The radio device 200 may further include a test case result transmitter 210, like will be described in more detail below. The configurable component 102, the configuration information transmitter 104, the permission information receiver 106, the radio circuit 202, the further configurable component 204, the test case information receiver 206, the test case evaluator 208, and the test case result transmitter 210 may be coupled with each other, e.g. via an electrical connection 212 such as e.g. a cable or a computer bus or via any other suitable electrical connection to exchange electrical signals.

According to various embodiments, the configurable component 102 may be configured to modify a property of the radio circuit 202. According to various embodiments, the configurable component 102 may be configured to modify a property of a waveform transmitted from the radio device.

According to various embodiments, the configurable component 102 may include or may be programmable logic.

According to various embodiments, the configurable component 102 may include or may be a field-programmable gate array.

According to various embodiments, the configurable component 102 may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, the configuration information transmitter 104 may be further configured to transmit an identifier of a configuration of the further configurable component 204 to the regulation server; and the permission information receiver 104 may be further configured to receive from the regulation server information indicating as to whether the radio device 200 is permitted to use the configuration of the configurable component 102 and the configuration of the further configurable component 204 or as to whether a pre-determined configuration of the configurable component 102 and a pre-determined configuration of the configurable component 204 are to be used by the radio device 200.

According to various embodiments, the information received from the regulation server may include information indicating as to whether the radio device 200 is permitted to first bring the configurable component 102 into the configuration of the configurable component 102 and to then bring the further configurable component 204 into the configuration of the further configurable component 204 and/or as to whether the radio device 200 is permitted to first bring the further configurable component 204 into the configuration of the further configurable component 204 and to then bring the configurable component 102 into the configuration of the configurable component 102.

According to various embodiments, the further configurable component 204 may be configured to modify a property of the radio circuit 202. According to various embodiments, the further configurable component 204 may be configured to modify a property of a waveform transmitted from the radio device.

According to various embodiments, the further configurable component 204 may include or may be programmable logic.

According to various embodiments, the further configurable component 204 may include or may be a field-programmable gate array.

According to various embodiments, the further configurable component 204 may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, the information identifying the radio device 200 may include or may be an identifier of the radio device 200.

According to various embodiments, the information identifying the radio device 200 may include or may be an identifier of a class of radio devices to which the radio device 200 belongs.

According to various embodiments, the configuration information transmitter 104 may be further configured to transmit the information identifying the radio device 200 and the identifier of the configuration of the configurable component 102 to the regulation server on an occasion related to modifying the configuration of the configurable component 102. For example in the case, when the configurable component is software, modifying the configuration of the configurable component may be understood as installing new software. For example in the case, when the configurable component is programmable logic, modifying the configuration of the configurable component may be understood as re-programming the programmable logic.

According to various embodiments, the pre-determined configuration of the configurable component 102 may be a configuration of not using the configurable component 102.

According to various embodiments, in case the permission information receiver 106 receives information indicating that the radio device 200 is not permitted to use the configuration of the configurable component 102, the radio device 200 may be blocked, for example the radio device 200 may be de-activated.

According to various embodiments, the test case information receiver 206 may be configured to receive information about a pre-determined test case from the regulation server.

According to various embodiments, the test case evaluator 208 may be configured to determine a result of the pre-determined test case.

According to various embodiments, the test case evaluator 208 may be configured to determine the result of the pre-determined test case in a loop-back mode.

According to various embodiments, the test case result transmitter 210 may be configured to transmit information about a result of the pre-determined test case to the regulation server.

According to various embodiments, the test case may include or may be at least one of a test case with respect to interference; a test case with respect to a spectral mask; and a test case with respect to energy consumption.

According to various embodiments, the radio device 200 may be configured to transmit information to the regulation server and to receive information from the regulation server via a responsible entity. In other words, the radio device 200 may transmit information to the regulation server and receive information from the regulation server not directly, but via a responsible entity which may be provided between the radio device 200 and the regulation server.

According to one embodiment, the configuration information transmitter includes an identifier generator configured to generate the identifier of the configuration of the configurable component.

The identifier generator is for example configured to generate a checksum of the configuration of the configurable component as the identifier of the configuration of the configurable component.

The radio device may further include a controller configured to configure the configurable component in accordance with the information received from the regulation server.

According to one embodiment, the configuration includes the usage of a plurality of software components and wherein the information received from the regulation server indicates a condition that has to be met by the radio device to be permitted to use the plurality of software components.

The condition is for example a condition with regard to the installation order of the plurality of software components.

The radio device of for example further includes a controller configured to reconfigure the configuration of the configurable component such that the condition is fulfilled. For example, the controller sets in the configuration that in case of WiFi usage, a certain communication mode is not used.

FIG. 3 shows a radio device 300 in accordance with an embodiment. The radio device 300 may include a configurable component 302; a certification storage 304 configured to store information about a digital certification associated with a configuration of the configurable component 302; a certification information transmitter 306 configured to transmit the information about the digital certification to a verification server (not shown, for example a verification server as described below with reference to FIG. 6); and a permission information receiver 308 configured to receive from the verification server information indicating as to whether the radio device 300 is permitted to use the configuration of the configurable component 302 or as to whether a pre-determined configuration of the configurable component 302 is to be used by the radio device 300. The configurable component 302, the certification storage 304, the certification information transmitter 306, and the permission information receiver 308 may be coupled with each other, e.g. via an electrical connection 310 such as e.g. a cable or a computer bus or via any other suitable electrical connection to exchange electrical signals.

According to various embodiments, information indicating as to whether the radio device 300 is permitted to use the configuration of the configurable component 302 or as to whether a pre-determined configuration of the configurable component 302 is to be used by the radio device 300 may be provided in the form of certification information, for example a positive certification or a negative certification.

According to various embodiments, the information about the digital certification may include or may be an identifier of the digital certification.

FIG. 4 shows a regulation server 400 in accordance with an embodiment. The regulation server 400 may include: a configuration information receiver 402 configured to receive, e.g. from a radio device (not shown, for example a radio device like described above with reference to FIG. 1 and FIG. 2), information identifying the radio device and an identifier of a configuration of a configurable component of the radio device; a permission determiner 404 configured to determine whether the radio device is permitted to use the configuration of the configurable component based on the received information identifying the radio device and the received identifier of the configuration of the configurable component of the radio device; and a permission information transmitter 406 configured to transmit information indicating as to whether the radio device is permitted to use the configuration of the configurable component or as to whether a pre-determined configuration of the configurable component is to be used by the radio device to the radio device. The configuration information receiver 402, the permission determiner 404, and the permission information transmitter 406 may be coupled with each other, e.g. via an electrical connection 408 such as e.g. a cable or a computer bus or via any other suitable electrical connection to exchange electrical signals.

It should be noted that the determining and the transmitting of the information does not necessarily have to be triggered by the reception of the information identifying the radio device and the identifier of a configuration of a configurable component of the radio device. The determining and the transmitting may also be triggered by a different event, e.g. that the radio device leaves a certain regulatory region and enters another regulatory region or that the requirements to be fulfilled by the configuration change because of some other reason.

Further, it should be noted that the regulation server may request the information identifying the radio device and the identifier of a configuration of a configurable component of the radio device from the radio device. For example, the regulation server may include a transmitter sending a corresponding request message to the radio device.

According to various embodiments, the radio device may include or may be at least one of a base station, a NodeB, a home base station, a home NodeB, a mobile radio communication device, a user equipment, a pager, a radio receiving apparatus, a walkie-talkie, an interference transmitter, a jammer transmitter, a remote control, a television station and a radio station.

According to various embodiments, the radio device may further include a radio circuit. According to variable embodiments, the configurable component may be configured to modify a property of the radio circuit. According to various embodiments, the configurable component may be configured to modify a property of a waveform transmitted from the radio device.

According to various embodiments, the configurable component may include or may be programmable logic.

According to various embodiments, the configurable component may include or may be a field-programmable gate array.

According to various embodiments, the configurable component may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, the radio device may further include a further configurable component. According to various embodiments, the configuration information receiver 402 may further be configured to receive an identifier of a configuration of the further configurable component from the radio device. According to various embodiments, the permission determiner 404 may further be configured to determine whether the radio device is permitted to use the configuration of the configurable component and the configuration of the further configurable component or as to whether a pre-determined configuration of the configurable component and a pre-determined configuration of the further configurable component are to be used by the radio device. According to various embodiments, the permission information transmitter 406 may further be configured to transmit to the radio device information indicating as to whether the radio device is permitted to use the configuration of the configurable component and the configuration of the further configurable component or as to whether a pre-determined configuration of the configurable component and a pre-determined configuration of the further configurable component are to be used by the radio device.

According to various embodiments, the permission determiner 404 may further be configured to determine whether the radio device is permitted to first bring the configurable component into the configuration of the configurable component and to then bring the further configurable component into the configuration of the further configurable component and/or as to whether the radio device is permitted to first bring the further configurable component into the configuration of the further configurable component and to then bring the configurable component into the configuration of the configurable component.

According to various embodiments, the further configurable component may be configured to modify a property of the radio circuit. According to various embodiments, the further configurable component may be configured to modify a property of a waveform transmitted from the radio device.

According to various embodiments, the further configurable component may include or may be programmable logic.

According to various embodiments, the further configurable component may include or may be a field-programmable gate array.

According to various embodiments, the further configurable component may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, the information identifying the radio device may include or may be an identifier of the radio device.

According to various embodiments, the information identifying the radio device may include or may be an identifier of a class of radio devices to which the radio device belongs.

According to various embodiments, the configuration information receiver 402 may be further configured to receive the information identifying the radio device and the identifier of the configuration of the configurable component from the radio device on an occasion related to modifying the configuration of the configurable component. For example in the case, when the configurable component is software, modifying the configuration of the configurable component may be understood as installing new software. For example in the case, when the configurable component is programmable logic, modifying the configuration of the configurable component may be understood as re-programming the programmable logic.

According to various embodiments, the pre-determined configuration of the configurable component may include or may be a configuration of not using the configurable component.

According to various embodiments, in case the permission information transmitter 406 transmits information indicating that the radio device is not permitted to use the configuration of the configurable component, the radio device may be blocked.

FIG. 5 shows a regulation server 500 in accordance with an embodiment. The regulation server 500 may, similar to the regulation server 400 of FIG. 4, include a configuration information receiver 402, a permission determiner 404, and a permission information transmitter 406. The regulation server 500 may further include a configuration storage 502, like will be described in more detail below. The regulation server 500 may further include a configuration information availability determiner 504, like will be described in more detail below. The regulation server 500 may further include a test case information transmitter 506, like will be described in more detail below. The regulation server 500 may further include a test case result receiver 508, like will be described in more detail below. The configuration information receiver 402, the permission determiner 404, the permission information transmitter 406, the configuration storage 502, the configuration information availability determiner 504, the test case information transmitter 506, and the test case result receiver 508, may be coupled with each other, e.g. via an electrical connection 510 such as e.g. a cable or a computer bus or via any other suitable electrical connection to exchange electrical signals.

According to various embodiments, the configuration information availability determiner 504 may be configured to determine whether information indicating as to whether a radio device corresponding to the received information identifying the radio device is permitted to use the configuration of the configurable component corresponding to the received identifier of the configuration of the configuration component of the radio device is stored in the configuration storage 502.

According to various embodiments, the configuration storage 502 may be configured to store information about valid digital certifications and about invalid digital certifications.

According to various embodiments, the permission determiner 504 may further be configured to determine whether the radio device is permitted to use the configuration of the configurable component based on the determination of the configuration information availability determiner 504.

According to various embodiments, the permission determiner 404 may be further configured to determine whether the radio device is permitted to use the configuration of the configurable component based on a pre-determined test case.

According to various embodiments, the test case information transmitter 506 may be configured to transmit information about the pre-determined test case to the radio device.

According to various embodiments, the test case result receiver 508 may be configured to receive information about a result of the pre-determined test case from the radio device.

According to various embodiments, the test case may include or may be at least one of a test case with respect to interference; a test case with respect to a spectral mask; and a test case with respect to energy consumption.

According to various embodiments, the test case information transmitter 506 may be configured to transmit information about the pre-determined test case in case it is determined by the configuration information availability determiner 504 that information indicating as to whether a radio device corresponding to the received information identifying the radio device is permitted to use the configuration of the configurable component corresponding to the received identifier of the configuration of the configuration component of the radio device is not stored in the configuration storage 502.

According to various embodiments, the regulation server 500 may be further configured to transmit information to the radio device and to receive information from the radio device via a responsible entity. In other words, the regulation server 500 may transmit information to the radio device and receive information from the radio device not directly, but via a responsible entity which may be provided between the regulation server 500 and the radio device.

FIG. 6 shows a verification server 600 in accordance with an embodiment. The verification server 600 may include a certification information receiver 602 configured to receive information about a digital certification associated with a configuration of a configurable component of a radio device, e.g. from the radio device (not shown, for example a radio device like described above with reference to FIG. 3); a permission determiner 604 configured to determine whether the radio device is permitted to use the configuration of the configurable component; and a permission information transmitter 606 configured to transmit to the radio device information indicating as to whether the radio device is permitted to use the configuration of the configurable component or as to whether a pre-determined configuration of the configurable component is to be used by the radio device. The certification information receiver 602, the permission determiner 604, and the permission information transmitter 606 may be coupled with each other, e.g. via an electrical connection 608 such as e.g. a cable or a computer bus or via any other suitable electrical connection to exchange electrical signals.

According to various embodiments, information indicating as to whether the radio device is permitted to use the configuration of the configurable component or as to whether a pre-determined configuration of the configurable component is to be used by the radio device may be provided in the form of certification information, for example a positive certification or a negative certification.

According to various embodiments, the permission determiner 604 may further be configured to determine whether the radio device is permitted to use the configuration of the configurable component based on the received information about the digital certification.

According to various embodiments, the certification information receiver 602 may further be configured to receive information identifying the radio device and an identifier of a configuration of the configurable component, and the permission determiner 604 may further be configured to determine whether the radio device is permitted to use the configuration of the configurable component based on the received information identifying the radio device and the received identifier of the configuration of the configurable component.

According to various embodiments, the permission information determiner 606 may determine whether the certification is valid, for example, whether the certification is a positive certification or whether the certification is a negative certification.

According to various embodiments, the information about the digital certification may include or may be an identifier of the digital certification.

According to various embodiments, a regulation server (for example like described with reference to FIG. 4 and FIG. 5 above) and a verification server (for example like described with reference to FIG. 6 above) may be separate devices or may be integrated into a single device.

According to various embodiments, a server may be provided, wherein the server may have one or more of the properties of one or more of the regulation server described with reference to FIG. 4 and FIG. 5 and the verification server described with reference to FIG. 6.

FIG. 7 shows a radio device 700 in accordance with an embodiment. The radio device 700 may include a configurable component 702; a storage 704 configured to store information about a digital certification associated with a configuration of the configurable component 702; and a changing circuit 706 configured to change the information stored in the storage 704. The configurable component 702, the storage 704, and the changing circuit 706 may be coupled with each other, e.g. via an electrical connection 708 such as e.g. a cable or a computer bus or via any other suitable electrical connection to exchange electrical signals.

According to various embodiments, a radio device may be provided, wherein the radio device may have one or more of the properties of one or more of the mobile devices described with reference to FIG. 1, FIG. 2, FIG. 3 and FIG. 7.

Figure 8:
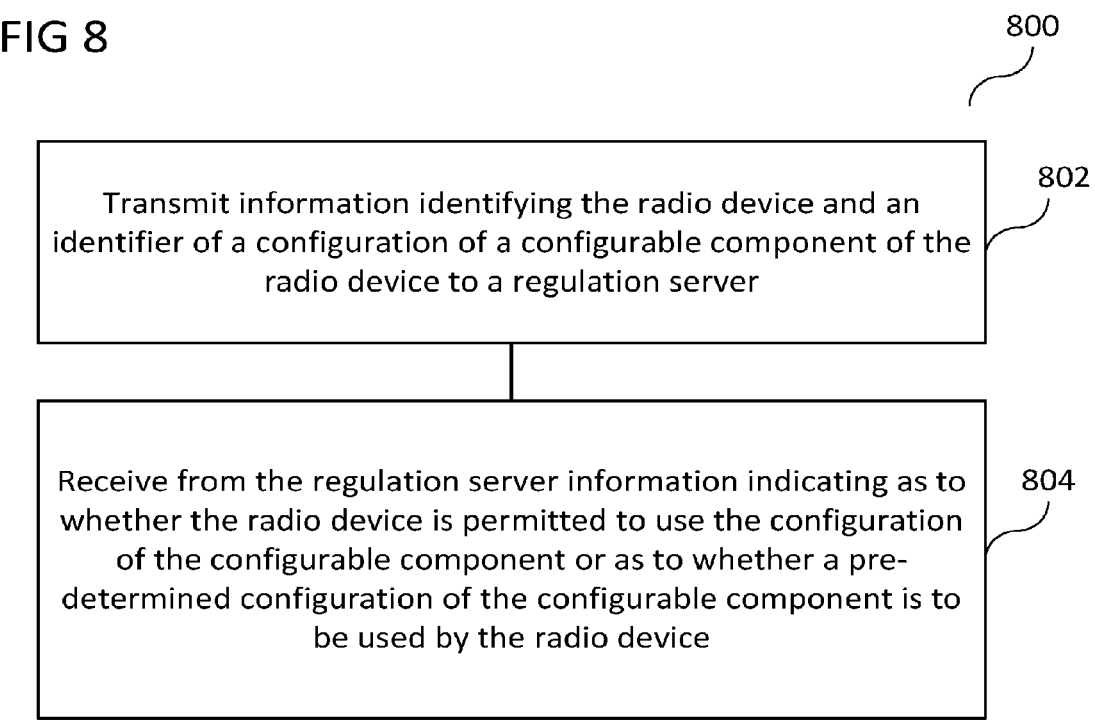
FIG. 8 shows a flow diagram illustrating a method for controlling a radio device in accordance with an embodiment.

FIG. 8 shows a flow diagram 800 illustrating a method for controlling a radio device in accordance with an embodiment. In 802, information identifying the radio device and an identifier of a configuration of a configurable component of the radio device may be transmitted to a regulation server. In 804, information indicating as to whether the radio device is permitted to use the configuration of the configurable component or as to whether a pre-determined configuration of the configurable component is to be used by the radio device may be received from the regulation server.

According to various embodiments, information indicating as to whether the radio device is permitted to use the configuration of the configurable component or as to whether a pre-determined configuration of the configurable component is to be used by the radio device may be provided in the form of certification information, for example a positive certification or a negative certification.

According to various embodiments, the radio device may include or may be at least one of a base station, a NodeB, a home base station, a home NodeB, a mobile radio communication device, a user equipment, a pager, a radio receiving apparatus, a walkie-talkie, an interference transmitter, a jammer transmitter, a remote control, a television station and a radio station.

According to various embodiments, the configurable component may be configured to modify a property of the radio circuit. According to various embodiments, the configurable component may be configured to modify a property of a waveform transmitted from the radio device.

According to various embodiments, the configurable component may include or may be programmable logic.

According to various embodiments, the configurable component may include or may be a field-programmable gate array.

According to various embodiments, the configurable component may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, an identifier of a configuration of a further configurable component of the radio device may be transmitted to the regulation server; and information indicating as to whether the radio device is permitted to use the configuration of the configurable component and the configuration of the further configurable component or as to whether a pre-determined configuration of the configurable component and a pre-determined configuration of the further configurable component are to be used by the radio device may be received from the regulation server.

According to various embodiments, the information received from the regulation server may include information indicating as to whether the radio device is permitted to first bring the configurable component into the configuration of the configurable component and to then bring the further configurable component into the configuration of the further configurable component and/or as to whether the radio device is permitted to first bring the further configurable component into the configuration of the further configurable component 204 and to then bring the configurable component into the configuration of the configurable component.

According to various embodiments, the further configurable component may be configured to modify a property of a radio circuit of the mobile device. According to various embodiments, the further configurable component may be configured to modify a property of a waveform transmitted from the radio device.

According to various embodiments, the further configurable component may include or may be programmable logic.

According to various embodiments, the further configurable component may include or may be a field-programmable gate array.

According to various embodiments, the further configurable component may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, the information identifying the radio device may include or may be an identifier of the radio device.

According to various embodiments, the information identifying the radio device may include or may be an identifier of a class of radio devices to which the radio device belongs.

According to various embodiments, the information identifying the radio device and the identifier of the configuration of the configurable component may be transmitted to the regulation server on an occasion related to modifying the configuration of the configurable component. For example in the case, when the configurable component is software, modifying the configuration of the configurable component may be understood as installing new software. For example in the case, when the configurable component is programmable logic, modifying the configuration of the configurable component may be understood as re-programming the programmable logic.

According to various embodiments, the pre-determined configuration of the configurable component may be a configuration of not using the configurable component.

According to various embodiments, in case the mobile device receives information indicating that the radio device is not permitted to use the configuration of the configurable component, the radio device may be blocked, for example the radio device may be de-activated.

According to various embodiments, information about a pre-determined test case may be received from the regulation server.

According to various embodiments, a result of the pre-determined test case may be determined.

According to various embodiments, the result of the pre-determined test case may be determined in a loop-back mode.

According to various embodiments, information about a result of the pre-determined test case may be transmitted to the regulation server.

According to various embodiments, the test case may include or may be at least one of a test case with respect to interference; a test case with respect to a spectral mask; and a test case with respect to energy consumption.

According to various embodiments, information may be transmitted to the regulation server and information may be received from the regulation server via a responsible entity. In other words, the radio device may transmit information to the regulation server and receive information from the regulation server not directly, but via a responsible entity which may be provided between the radio device and the regulation server.

FIG. 9 shows a flow diagram 900 illustrating a method for controlling a radio device in accordance with an embodiment. In 902, information about a digital certification associated with a configuration of a configurable component of the radio device may be stored. In 904, the information about the digital certification may be transmitted to a verification server. In 906, information indicating as to whether the radio device is permitted to use the configuration of the configurable component or as to whether a pre-determined configuration of the configurable component is to be used by the radio device may be received from the verification server.

According to various embodiments, information indicating as to whether the radio device is permitted to use the configuration of the configurable component or as to whether a pre-determined configuration of the configurable component is to be used by the radio device may be provided in the form of certification information, for example a positive certification or a negative certification.

According to various embodiments, the information about the digital certification may include or may be an identifier of the digital certification.

FIG. 10 shows a flow diagram 1000 illustrating a method for controlling a regulation server in accordance with an embodiment. In 1002, information identifying a radio device and an identifier of a configuration of a configurable component of the radio device may be received from the radio device. In 1004, it may be determined whether the radio device is permitted to use the configuration of the configurable component based on the received information identifying the radio device and the received identifier of the configuration of the configurable component of the radio device. In 1006, information indicating as to whether the radio device is permitted to use the configuration of the configurable component or as to whether a pre-determined configuration of the configurable component is to be used by the radio device may be transmitted to the radio device.

According to various embodiments, information indicating as to whether the radio device is permitted to use the configuration of the configurable component or as to whether a pre-determined configuration of the configurable component is to be used by the radio device may be provided in the form of certification information, for example a positive certification or a negative certification.

According to various embodiments, the radio device may include or may be at least one of a base station, a NodeB, a home base station, a home NodeB, a mobile radio communication device, a user equipment, a pager, a radio receiving apparatus, a walkie-talkie, an interference transmitter, a jammer transmitter, a remote control, a television station and a radio station.

According to variable embodiments, a property of the radio circuit may be modified by the configurable component. According to various embodiments, a property of a waveform transmitted from the radio device may be modified by the configurable component.

According to various embodiments, the configurable component may include or may be programmable logic.

According to various embodiments, the configurable component may include or may be a field-programmable gate array.

According to various embodiments, the configurable component may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, an identifier of a configuration of a further configurable component of the radio device may be received from the radio device. According to various embodiments, it may be determined whether the radio device is permitted to use the configuration of the configurable component and the configuration of the further configurable component or as to whether a pre-determined configuration of the configurable component and a pre-determined configuration of the configurable component are to be used by the radio device. According to various embodiments, information indicating as to whether the radio device is permitted to use the configuration of the configurable component and the configuration of the further configurable component or as to whether a pre-determined configuration of the configurable component and a pre-determined configuration of the configurable component are to be used by the radio device may be transmitted to the radio device.

According to various embodiments, it may be determined whether the radio device is permitted to first bring the configurable component into the configuration of the configurable component and to then bring the further configurable component into the configuration of the further configurable component and/or as to whether the radio device is permitted to first bring the further configurable component into the configuration of the further configurable component and to then bring the configurable component into the configuration of the configurable component. According to various embodiments, this determined information may be transmitted to the radio device.

According to various embodiments, a property of the radio circuit may be modified by the further configurable component. According to various embodiments, a property of a waveform transmitted from the radio device may be modified by the further configurable component.

According to various embodiments, the further configurable component may include or may be programmable logic.

According to various embodiments, the further configurable component may include or may be a field-programmable gate array.

According to various embodiments, the further configurable component may include or may be software.

According to various embodiments, the software may include or may be firmware.

According to various embodiments, the software may include or may be application software.

According to various embodiments, the software may include or may be software of a physical layer.

According to various embodiments, the software may include or may be software of a data link layer.

According to various embodiments, the software may include or may be software of a logical link control layer.

According to various embodiments, the software may include or may be software of a media access control layer.

According to various embodiments, the information identifying the radio device may include or may be an identifier of the radio device.

According to various embodiments, the information identifying the radio device may include or may be an identifier of a class of radio devices to which the radio device belongs.

According to various embodiments, the information identifying the radio device and the identifier of the configuration of the configurable component may be received from the radio device on an occasion related to modifying the configuration of the configurable component. For example in the case, when the configurable component is software, modifying the configuration of the configurable component may be understood as installing new software. For example in the case, when the configurable component is programmable logic, modifying the configuration of the configurable component may be understood as re-programming the programmable logic.

According to various embodiments, the pre-determined configuration of the configurable component may include or may be a configuration of not using the configurable component.

According to various embodiments, in case information indicating that the radio device is not permitted to use the configuration of the configurable component is transmitted, the radio device may be blocked.

According to various embodiments, it may be determined whether information indicating as to whether a radio device corresponding to the received information identifying the radio device is permitted to use the configuration of the configurable component corresponding to the received identifier of the configuration of the configuration component of the radio device is stored in a configuration storage of the regulation server.

According to various embodiments, information about valid digital certifications and about invalid digital certifications may be stored.

According to various embodiments, it may be determined whether the radio device is permitted to use the configuration of the configurable component based on the determination of the configuration information availability determiner.

According to various embodiments, it may be determined whether the radio device is permitted to use the configuration of the configurable component based on a pre-determined test case.

According to various embodiments, information about the pre-determined test case may be transmitted to the radio device.

According to various embodiments, information about a result of the pre-determined test case may be received from the radio device.

According to various embodiments, the test case may include or may be at least one of a test case with respect to interference; a test case with respect to a spectral mask; and a test case with respect to energy consumption.

According to various embodiments, information about the pre-determined test case may be transmitted in case it is determined by the configuration information availability determiner that information indicating as to whether a radio device corresponding to the received information identifying the radio device is permitted to use the configuration of the configurable component corresponding to the received identifier of the configuration of the configuration component of the radio device is not stored in the configuration storage.

According to various embodiments, information may be transmitted to the radio device and information may be received from the radio device via a responsible entity. In other words, the regulation server may transmit information to the radio device and receive information from the radio device not directly, but via a responsible entity which may be provided between the regulation server and the radio device.

Figure 11:
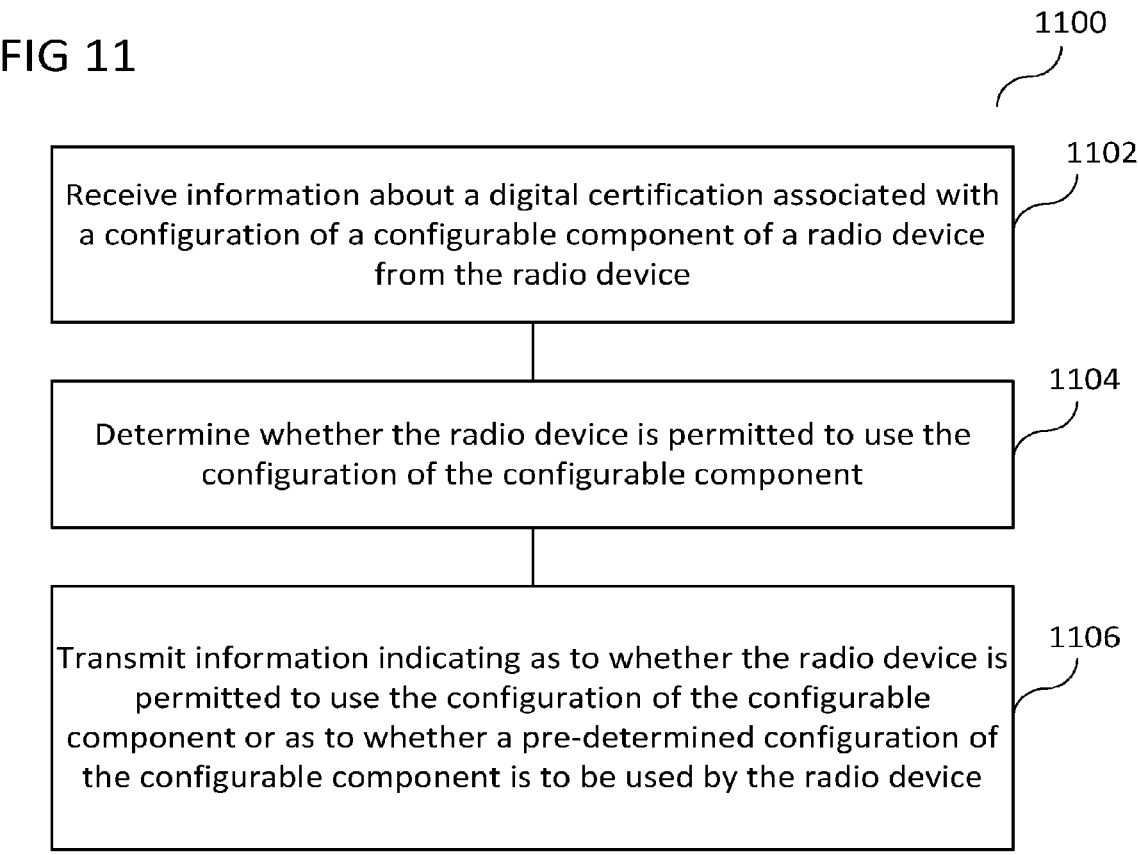
FIG. 11 shows a flow diagram illustrating a method for controlling a verification server in accordance with an embodiment.

FIG. 11 shows a flow diagram 1100 illustrating a method for controlling a verification server in accordance with an embodiment. In 1102, information about a digital certification associated with a configuration of a configurable component of a radio device may be received from the radio device. In 1104, it may be determined whether the radio device is permitted to use the configuration of the configurable component. In 1106, information indicating as to whether the radio device is permitted to use the configuration of the configurable component or as to whether a pre-determined configuration of the configurable component is to be used by the radio device may be transmitted to the radio device.

According to various embodiments, information indicating as to whether the radio device is permitted to use the configuration of the configurable component or as to whether a pre-determined configuration of the configurable component is to be used by the radio device may be provided in the form of certification information, for example a positive certification or a negative certification.

According to various embodiments, information identifying the radio device and an identifier of a configuration of the configurable component may be received, and it may be determine whether the radio device is permitted to use the configuration of the configurable component based on the received information identifying the radio device and the received identifier of the configuration of the configurable component.

According to various embodiments, it may be determined whether the certification is valid, for example, whether the certification is a positive certification or whether the certification is a negative certification.

According to various embodiments, the information about the digital certification may include or may be an identifier of the digital certification.

Figure 12:
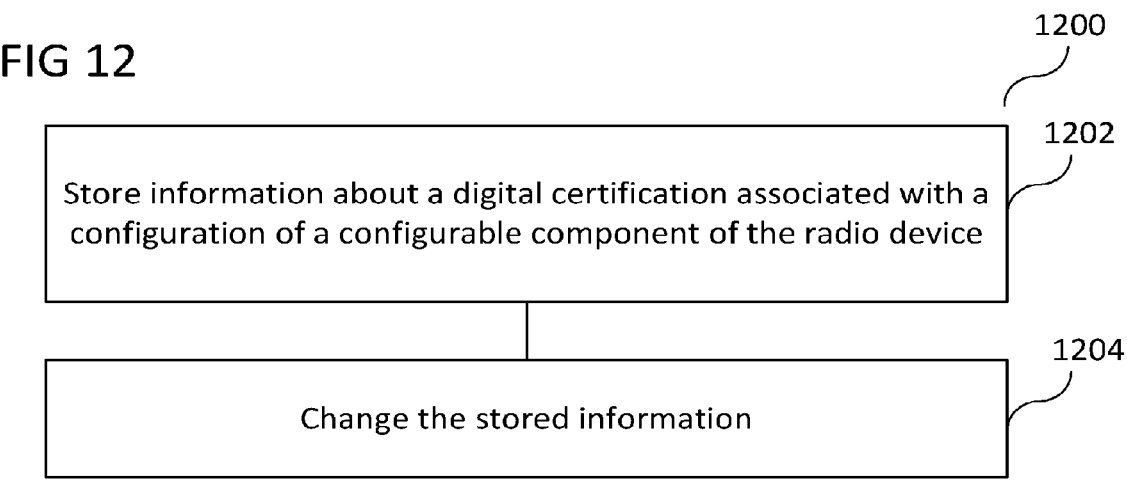
FIG. 12 shows a flow diagram illustrating a method for controlling a radio device in accordance with an embodiment.

FIG. 12 shows a flow diagram 1200 illustrating a method for controlling a radio device in accordance with an embodiment. In 1202, information about a digital certification associated with a configuration of a configurable component of the radio device may be stored. In 1204, the stored information may be changed.

Figure 13:
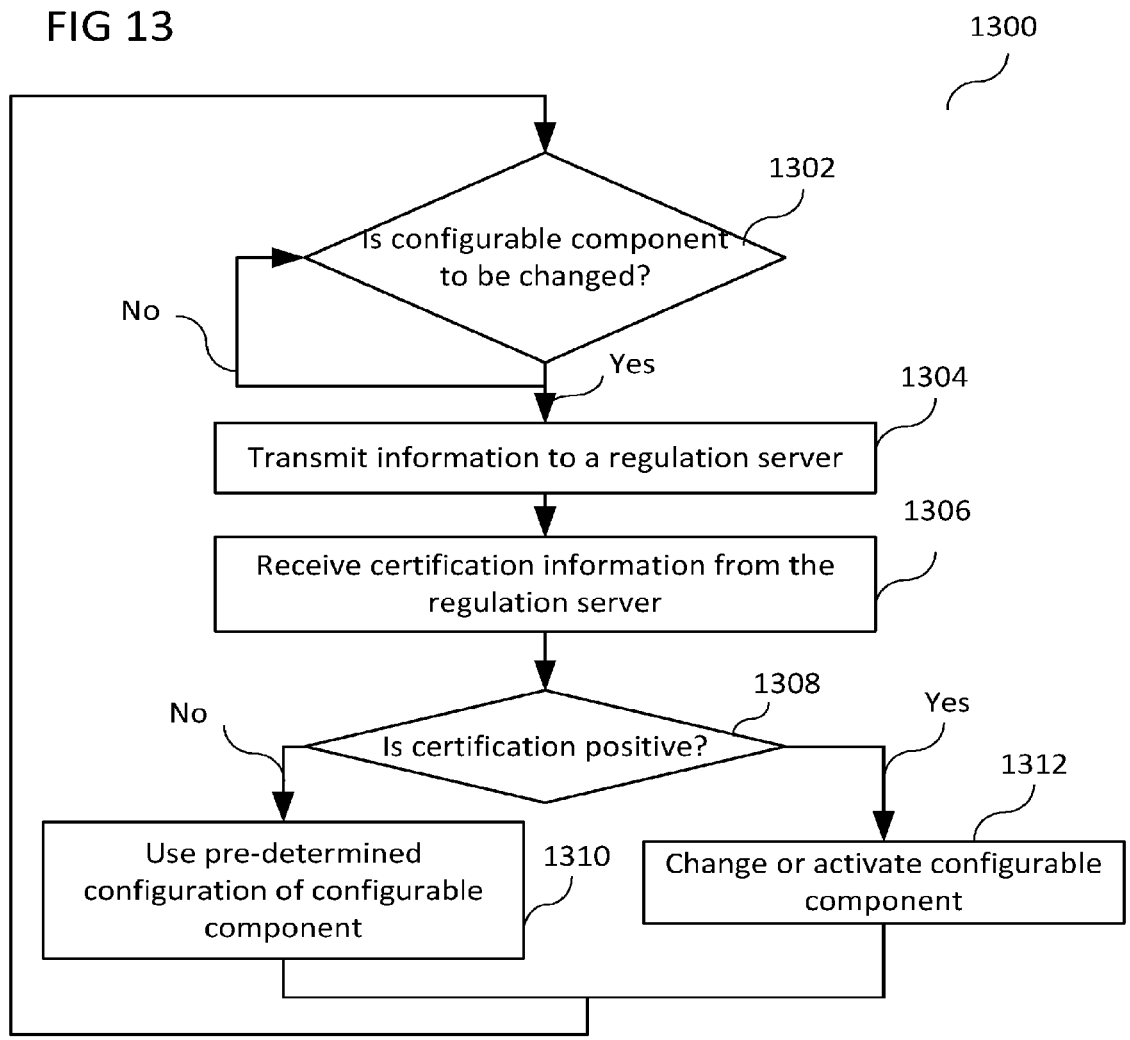
FIG. 13 shows a flow diagram illustrating a method for controlling a radio device in accordance with an embodiment.

FIG. 13 shows a flow diagram 1300 illustrating a method for controlling a radio device in accordance with an embodiment. In 1302, the radio device may determine whether a configurable component of the radio device is to be changed. In case there is no configurable component of the radio device that is to be changed (1302; No), the radio device may perform this determination repeatedly, for example on a time basis or on an interrupt basis. In case a configurable component of the radio device is to be changed (1302; Yes), in 1304, the radio device may transmit information to a regulation server. For example, the radio device may transmit information about itself and about a configuration of the configurable component, for example of a desired change of the configuration, like described above and below. In response, in 1306, the radio device may receive certification information from the regulation server. In 1308, the radio device may determine whether the certification information is positive. In case the certification is positive (1308; Yes), in 1312, the radio device may change or activate the configurable component. In case the certification is negative (1308; No), in 1310, the radio device may use a pre-determined configuration of the configurable component, or the radio device may not use the pre-determined configuration at all, or the radio device may be de-activated.

Figure 14:
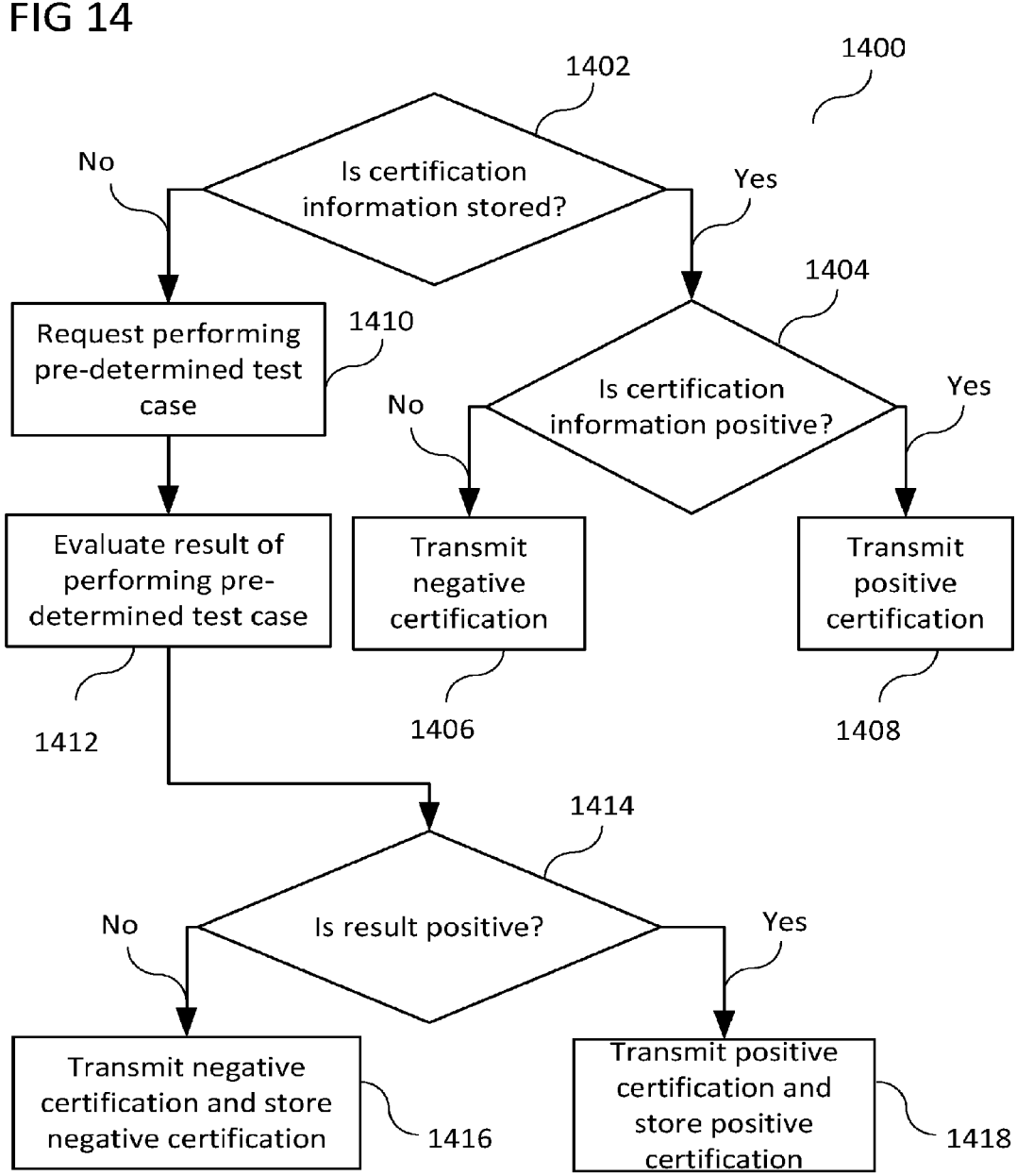
FIG. 14 shows a flow diagram illustrating a method for controlling a regulation server in accordance with an embodiment.

FIG. 14 shows a flow diagram 1400 illustrating a method for controlling a regulation server in accordance with an embodiment. In 1402, the regulation server may determine whether certification information for a combination of radio device (or class of radio device) and configurable component (or a plurality of configurable components) is stored in a storage of the regulation server. In case certification information is stored (1402; Yes), in 1404, the regulation server may determine whether the certification information is positive. In case the certification information is positive (1404; Yes), in 1408, the regulation server may transmit positive certification information to the radio device. In case the certification information is not positive (1404; No), in 1406, the regulation server may transmit negative certification information to the radio device. In case certification information is not stored (1402; No), in 1410, the regulation server may request the radio device to perform a pre-determined test case, for example by sending information about the pre-determined test case to the radio device. Then, in 1412, the regulation server may evaluate the result of performing the pre-determined test case. In 1414, the regulation server may determine whether the result of the test case is positive. In case the result is positive (1414; Yes), in 1418, the regulation server may transmit positive certification information to the radio device and may store positive certification information in the storage of the regulation server. In case the result is negative (1414; No), in 1416, the regulation server may transmit negative certification information to the radio device and may store negative certification information in the storage of the regulation server.

It will be understood that "positive certification" may mean certification information which allow operation of a mobile device and a configuration to which the certification refers, and that "negative certification" may mean certification information which denies operation of a mobile device and a configuration to which the certification refers.

According to various embodiments, devices and methods may be provided for Dynamic and Digital Declaration of Conformity (DoC) and CE Marking of a reconfigurable wireless device.

According to various embodiments, devices and methods may be provided that may be used in conjunction with the process of the European commission is creating a revision of the R&TTE Directive (Radio equipment and telecommunications terminal equipment and the mutual recognition of their conformity directive). This directive may be the fundamental regulatory basis for operating radio equipment and it may be a basis for operating wireless mobile user devices (such as handsets, etc.).

In the new revision of the R&TTE Directive, the European Commission may desire to make sure that flexible radio platforms (such as next generation platforms building on SDR (software defined radio)) are supported. From a regulatory perspective, for example the aspects described in more detail above and below may be taken into account.

According to various embodiments, R&TTE directive related issues with respect to flexible radio platforms may be handled like will be described in more detail below.

According to various embodiments, a vertical market model framework (for example where one single entity controls all reconfiguration processes and controls available SW components) may be provided. According to various embodiments, novel features properties, like for example a novel RAT (radio access technology), may impact DoC/physical CE marking.

According to various embodiments, a horizontal market model (for example where several independent entities may provide software components and the reconfiguration process may not be controlled by a single entity) may be provided. According to various embodiments, provision of features, for example update of a RAT, by 3rd party SW (software) providers may impact DoC/physical CE marking According to various embodiments, devices and methods may be provided for identification of responsibilities for example in a case that a device does not operate following the rules, or in post market surveillance.

According to various embodiments, in order to enable SW updates and thus provision of new air interfaces or cognitive radio features after the sale of a wireless device, devices and methods for the following items may be provided:
Digital/Dynamic DoC;
Digital/Dynamic CE marking;
Device/HW/SW registration process;
Device/HW list of authorized 3rd party SW;
Security checks (for example against inappropriate downloads); and
SDR reconfiguration log history.

According to various embodiments, devices and methods may be provided for Digital/Dynamic DoC and Digital/Dynamic CE marking.

According to various embodiments, devices and methods may be provided that consider the delivery of novel air interfaces, the delivery of novel cognitive radio features, etc. by the provision of corresponding SW components.

According to various embodiments, devices and methods may be provided for the following mechanisms:
Digital/Dynamic DoC;
Digital/Dynamic CE marking;
Device/HW/SW registration process;
Device/HW list of authorized 3rd party SW;
Security checks (against inappropriate downloads, etc.); and
SDR reconfiguration log history.

According to various embodiments, devices and methods may be provided for the upper list of items, for example considering the Digital/Dynamic DoC and Digital/Dynamic CE marking.

According to various embodiments, devices and methods may be provided for enabling the provision of novel air interfaces, cognitive radio features, etc. after the sale of a wireless mobile device, for example considering the Digital/Dynamic DoC and Digital/Dynamic CE marking.

According to various embodiments, devices and methods may be provided for an introduction of Digital/Dynamic DoC and Digital/Dynamic CE marking.

According to various embodiments, identifiers (IDs) may be provided for one or more of the following:
Mobile Device ID (for example attributed after manufacturing process), for example either given to each specific Mobile Device or to a class of Mobile Devices;
Software Component IDs, for example a different ID may be given to each SW Component that may be installed on a Mobile Device;
Digital/Dynamic DoC ID; and
Digital/Dynamic CE marking ID.

According to various embodiments, the respective identifiers may be provided both in a central database (for example in a regulation server and/or in a verification server) and in the mobile device.

According to various embodiments, two cases may be considered: i) The vertical market model (where for example all reconfiguration actions may be controlled by a single entity, for example the mobile device manufacturer, the operator, etc.) and ii) the horizontal market (where for example reconfiguration actions may be not controlled by a single entity, such that for example a mobile device owner can install SW components providing new air interfaces, novel cognitive radio features, etc.).

According to various embodiments, in the vertical market model, the SW provisioning may be provided to operate as follows:
1) A responsible entity may request the current Mobile Device ID from the target mobile device (or the ID of a class of mobile devices if the SW components should be installed onto such a class of devices within one step) as well as the IDs of the installed SW Components and the Digital/Dynamic DoC ID and/or Digital/Dynamic CE marking ID (if it has any);

2) If no Digital/Dynamic DoC ID and/or Digital/Dynamic CE marking ID are yet assigned to a mobile device, the responsible entity may connect to a regulator service center (for example a regulation server, for example automated) and may request the creation of novel IDs for Digital/Dynamic DoC and Digital/Dynamic CE marking. According to various embodiments, a preliminary ID may be delivered to the responsible node, for example the responsible entity, but it may not yet enable the target mobile device to operate novel SW components (according to various embodiments, this may occur only later in this process);

3) The responsible entity may connect to a regulator service center (for example the regulation server, for example automated), may transfer the mobile device ID, the IDs of all installed SW components (if any), the ID of the new SW component to be installed and the (preliminary or active) Digital/Dynamic DoC ID and/or Digital/Dynamic CE marking ID. The regulator service center may be requested to allow the operation of the novel SW component in addition to the available ones. According to various embodiments, two cases may be possible:

First case: The correct operation of all SW components on the given platform have already been verified. In this case, the requested Digital/Dynamic DoC ID and/or Digital/Dynamic CE marking ID may be granted (if a preliminary ID had been granted before, this preliminary ID may be confirmed and may be considered to be an active ID in the future);

Second case: The correct operation of all SW components on the given platform have not yet been verified. According to various embodiments, the regulator service center may provide a test license, delivering some testing SW to be run on the mobile device with the new SW components. This test SW may be installed on the mobile device along with the new SW components. According to various embodiments, this test may run exploiting a loop-back mode in the mobile device, where for example no signal may be passed to the antenna and such any interference to neighboring devices may be avoided. According to various embodiments, the results of this test may then be transferred again to the regulator service center. If the regulator service center considers the test to be successful, the requested Digital/Dynamic DoC ID and/or Digital/Dynamic CE marking ID may be granted (if a preliminary ID had been granted before, this preliminary ID may be confirmed and may be considered to be an active ID in the future). According to various embodiments, otherwise, the requested Digital/Dynamic DoC ID and/or Digital/Dynamic CE marking ID may be denied;

4) In case that new Digital/Dynamic DoC ID and/or Digital/Dynamic CE marking ID have been granted, they may be stored (along with the mobile device (class) ID and the SW component IDs) in a (regulator operated) database;

5) In case that the Digital/Dynamic DoC ID and/or Digital/Dynamic CE marking ID have been granted, the mobile device may start operating the new SW components, for example leading to the support of new air interfaces, new cognitive radio features, etc.

According to various embodiments, in the horizontal market model, the SW provisioning may be provided to operate as follows:

1) The target mobile device may identify its own mobile device ID and the IDs of the installed SW Components and the Digital/Dynamic DoC ID and/or Digital/Dynamic CE marking ID (if it has any);

2) If no Digital/Dynamic DoC ID and/or Digital/Dynamic CE marking ID are yet assigned to a mobile device, the target mobile device may connect to a regulator service center (for example automated) and may request the creation of novel IDs for Digital/Dynamic DoC and Digital/Dynamic CE marking. According to various embodiments, a preliminary ID may be delivered to the target mobile device, but it may not yet enable the target mobile device to operate novel SW components (according to various embodiments, this may occur only later in this process);

3) The target mobile device may connect to a regulator service center (for example a regulation server, for example automated), may transfer the mobile device ID, the IDs of all installed SW components (if any), the ID of the new SW component to be installed and the (preliminary/active) Digital/Dynamic DoC ID and/or Digital/Dynamic CE marking ID. According to various embodiments, the regulator service center may be requested to allow the operation of the novel SW component in addition to the available ones. According to various embodiments, two cases may be possible:

First case: The correct operation of all SW components on the given platform have already been verified. In this case, the requested Digital/Dynamic DoC ID and/or Digital/Dynamic CE marking ID may be granted (if a preliminary ID had been granted before, this preliminary ID may be confirmed and may be considered to be an active ID in the future);

Second case: The correct operation of all SW components on the given platform have not yet been verified. According to various embodiments, the regulator service center may provide a test license, delivering some testing SW to be run on the mobile device with the new SW components. According to various embodiments, this test SW may be installed on the mobile device along with the new SW components. According to various embodiments, this test may run exploiting a loop-back mode in the mobile device, where for example no signal may be passed to the antenna and such any interference to neighboring devices may be avoided. According to various embodiments, the results of this test may then be transferred again to the regulator service center. According to various embodiments, if the regulator service center considers the test to be successful, the requested Digital/Dynamic DoC ID and/or Digital/Dynamic CE marking ID may be granted (if a preliminary ID had been granted before, this preliminary ID may be confirmed and may be considered to be an active ID in the future). According to various embodiments, otherwise, the requested Digital/Dynamic DoC ID and/or Digital/Dynamic CE marking ID may be denied;

4) In case that new Digital/Dynamic DoC ID and/or Digital/Dynamic CE marking ID have been granted, they may be stored (for example along with the mobile device (class) ID and the SW component IDs) in a (for example regulator operated) database. According to various embodiments, a limited time frame for validity may be assigned, for example to the Digital/Dynamic DoC ID and/or Digital/Dynamic CE marking ID;

5) In case that the Digital/Dynamic DoC ID and/or Digital/Dynamic CE marking ID have been granted, the mobile device may start operating the new SW components, for example leading to the support of new air interfaces, new cognitive radio features, etc.

According to various embodiments, devices and methods may be provided for verification of digital/dynamic DoC and digital/dynamic CE marking.

According to various embodiments, in case that the user of a mobile wireless devices goes to another country, the operators in the new country may want to verify the DoC and CE marking. According to various embodiments, in case of digital/dynamic DoC IDs and digital/dynamic CE marking IDs, this may be provided by the automated process detailed below.

According to various embodiments, devices and methods may be provided for performing the following process:

1) A regulator verification center (for example a verification server) may be contacting a given target mobile device (for example by an IP (Internet Protocol) link) and requests the ID of the mobile device, the IDs of the installed SW components and the Digital/Dynamic DoC ID and/or Digital/Dynamic CE marking ID (if any are attributed);

2) The target mobile device may deliver the requested IDs to the regulator verification center;

3) The regulator verification center may verify whether the Digital/Dynamic DoC ID and/or Digital/Dynamic CE marking ID are still valid (in case that a limited time frame of validity has been assigned) by requesting the corresponding information from the above mentioned (regulator operated) database. According to various embodiments, in case that the Digital/Dynamic DoC ID and/or Digital/Dynamic CE marking ID are not valid (for example if they are expired), the target mobile device may be contacted to either shut-down, to operate just a set of validated SW components, etc.;

4) If the target mobile device is allowed to operate, the regulator verification center may verify (e.g. by contacting the above mentioned (regulator operated) database with the various IDs it has obtained from the target mobile device) whether some possible configurations of the target mobile device are unlawful in the current country or area or region, for example.

5) If some possible configurations of the target mobile device turn out to be unlawful in the current country/area/region/etc., the regulator verification center may be transferring a list of allowed (or forbidden) configurations to the target mobile device;

6) The target mobile device may receive the list of allowed (or forbidden) configurations and may operate in accordance to the local legal framework.

According to various embodiments, devices and methods may be provided for introduction of digital/dynamic DoC and digital/dynamic CE marking like described above, including:

specific mechanism for the vertical market model;

specific mechanism for the horizontal market model;

introduction of a digital ID for digital/dynamic DoC and digital/dynamic CE marking;

specific consideration whether the certification of the requested configuration was already granted earlier or not; and setup of data-bases for Digital/Dynamic DoC and Digital/Dynamic CE marking.

According to various embodiments, devices and methods may be provided for performing procedures for verification of digital/dynamic DoC and digital/dynamic CE marking like described above, including:

verification procedures as such; and subsequent steps in case that operation of device in its current configuration is possible or is not possible, e.g. when moving across borders to another country.

According to various embodiments, a mobile device may desire to install new SW components after the sale of a device. According to the mechanism described above, it may be possible to provide the SW components for both a horizontal and vertical market model and to perform the assignment of digital/dynamic DoC IDs and digital/dynamic CE marking IDs.

According to various embodiments, devices and methods may be provided for introducing digital/dynamic DoC (Declaration of Conformity) and digital/dynamic CE marking for both the vertical market model (for example where all reconfiguration actions may be controlled by a single entity, for example the mobile device manufacturer, the operator, etc.) and the horizontal market model (where for example reconfiguration actions may be not controlled by a single entity, such that for example a mobile device owner may install SW components providing new air interfaces, novel cognitive radio features, etc.).

According to various embodiments, devices and methods may be provided for the introduction of digital/dynamic DoC and digital/dynamic CE marking which may allow for the usage of advanced flexible mobile device platform features such as the download of new air interfaces, advanced cognitive radio features, etc. after the sale of the device.

According to various embodiments, devices and methods may be provided for the verification of digital/dynamic DoC and digital/dynamic CE marking, which may allow to have an automated verification of the DoC and CE marking.

A key issue for operating a reconfigurable wireless device may be seen to be related to the following Article in the newly revised text of the R&TTE Directive (Article 3bis):

1. Manufacturers of radio equipment shall take steps to ensure that software having the potential to affect the compliance of radio equipment with the essential requirements in this Directive can only be loaded into the radio equipment where the compliance with the essential requirements in this Directive of the combination of software with the radio equipment has been demonstrated.

According to the European Commission (EC) this text may be interpreted in the following way: Manufacturers of radio devices are not responsible for ensuring the compliance of a device, but the manufacturers need to introduce steps such that for example a third party test house can take the task of ensuring and guaranteeing the conformity of a device to the essential requirements.

According to one embodiment, a mechanism within a reconfigurable radio device is provided such that the requirements of the R&TTE Directive are met, i.e. a radio device (e.g. a mobile device) is configured to carry out one or more steps such that it can be ensured that "software having the potential to affect the compliance of radio equipment with the essential requirements in this Directive can only be loaded into the radio equipment where the compliance with the essential requirements in this Directive of the combination of software with the radio equipment has been demonstrated".

Specifically, according to one embodiment, a radio device is provided including a receiver configured to receive program code of software having the potential to affect the compliance of the radio device with a radio device operation directive; a checking circuit configured to check whether the operation of the software on the radio device complies with the radio device operation directive; and a controller configured to allow installation of the software on the radio device if the combination of the software with the radio device complies with the radio device operation directive.

The radio device operation directive may be understood as a directive with regard to the operation of radio devices such as telecommunication devices, e.g. the R&TTE Directive.

According to one embodiment, a method for operating a radio device according to the radio device described above is provided.

In the framework of the current R&TTE Directive (i.e., the version of the R&TTE Directive before its revision), the manufacturers were responsible for ensuring the compliance of any (mobile) devices to the essential requirements. Within the new framework, this approach may still be viable, since the requirement "Manufacturers of radio equipment shall take steps to ensure . . . " may be seen to include the option that the manufacturer fully guarantees for the compliance of the radio device. However, this option may be unfavourable for the manufacturer, since he would need to guarantee for any possible software component that can be installed and he would need to certify any possible installation order in case that multiple components are installed and executed simultaneously (such as multiple software components for multiple Radio Access Technologies (RATs) that are operated simultaneously).

In the following, embodiments are described that may be favourable for a radio device manufacturer, and that may be seen to focus or be based on steps taken in a radio device such that the actual certification task can be undertaken by a 3rd party (certification/test) service provider.

Figure 15:
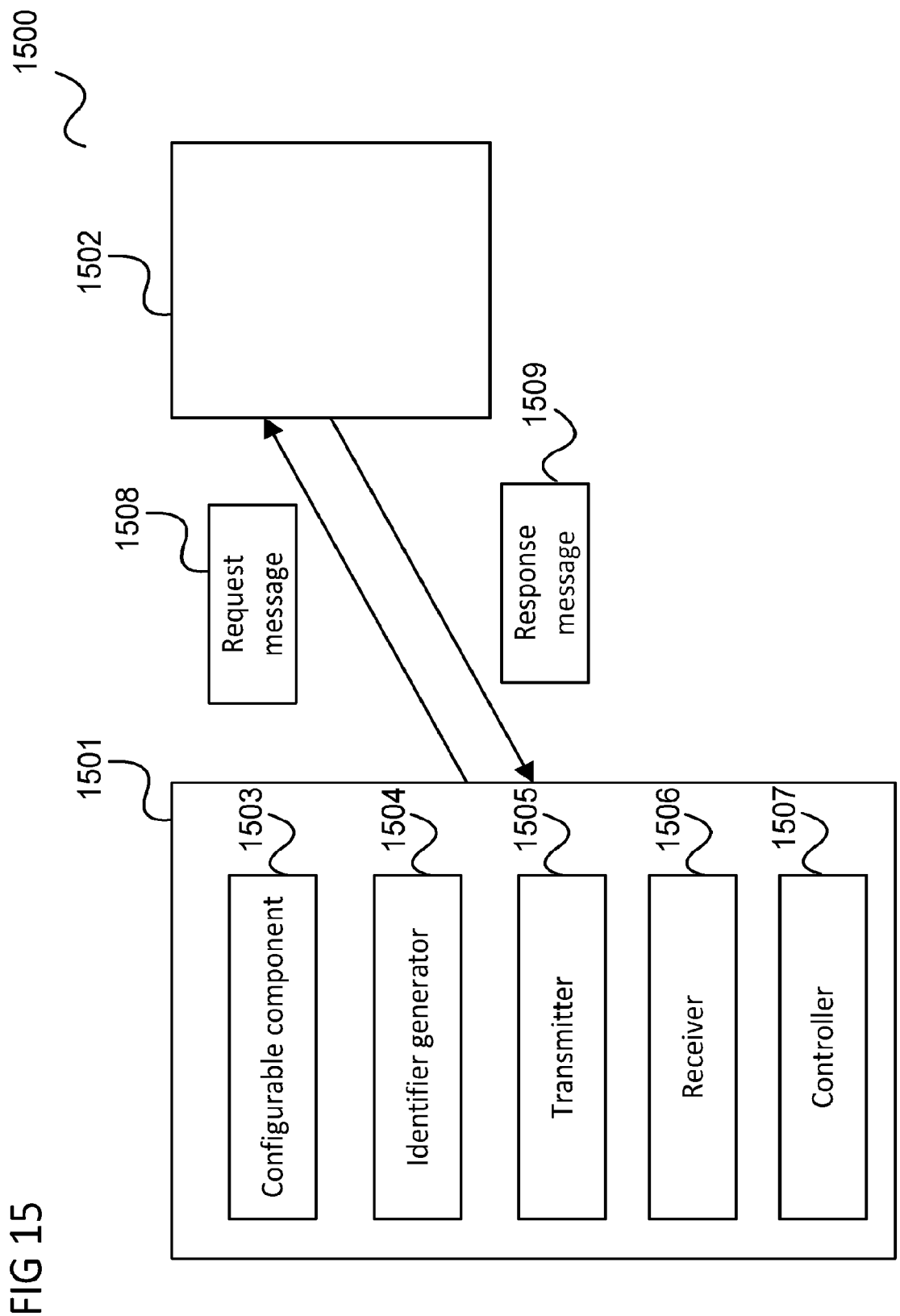
FIG. 15 shows a communication arrangement in accordance with an embodiment.

FIG. 15 shows a communication arrangement 1500 in accordance with an embodiment.

The communication arrangement 1500 includes a radio device 1501 and a regulation server 1502.

The radio device 1501 is for example a reconfigurable mobile radio device and for example corresponds to the radio device 100 described with reference to FIG. 1 or to the radio device 200 described with reference to FIG. 2.

The regulation server 1502 for example corresponds to the regulation server 400 described with reference to FIG. 4 or to the regulation server 500 described with reference to FIG. 5.

Similarly to the radio device 100 and the radio device 200, the radio device 1501 includes a configurable component 1503.

Further, the radio device 1501 includes an identifier generator 1504 (also referred to as first processing unit or first processing circuit of the radio device 1501) configured to generate an identifier of a configuration of the configurable component 1503.

According to one embodiment, the identifier generator 1504 creates a representative checksum for a software component (e.g. a hash value) to be installed on the radio device 1501 (and thus to configure the configurable component 1503) taking into account previously installed software components and the order of the installation of software components.

The regulation server may for example have stored a table in a memory which contains for each possible value of the checksum the software configuration (e.g. the software components and their order of installation) corresponding to this value of the checksum.

For example, the configurable component 1503 includes a plurality of configurable parts (or blocks) such as a reconfigurable base band circuit and a reconfigurable radio frequency (RF) circuit. In this case, the checksum may be example calculated for each reconfigurable part (e.g. for the software to be installed for each reconfigurable part) having the potential to affect the compliance of the radio device with a requirement.

A requirement is for example a requirement according to the R&TTE Directive and may for example relate to interference or safety. For example, a requirement may be that the interference caused by the radio device 1501 to other radio devices (using the same or different radio access technologies) is within certain limits or that the output power of the radio device 1501 is within certain limits.

The radio device 1501 further includes a transmitter 1505 (also referred to as second processing unit or second processing circuit of the radio device 1501) configured to transmit the identifier of a configuration of the configurable component 1502 to the regulation server 1502 by means of a request message 1506.

According to one embodiment, the transmitter 1505 communicates the checksum calculated by the identifier generator 1504 to the regulation server 1502 (e.g. a certification server).

The regulation server 1502 decides whether the radio device 1501 may use the configuration. For example, the regulation server 1502 determines whether a certificate exists for the configuration identified by the identifier (e.g. whether the configuration has already been certified, e.g. for the specific type of radio device). The regulation server 1502 signals the result of the decision to the radio device 1501 by means of a response message 1509. For example, the regulation server may permit the usage of the configuration. The usage of the configuration may be linked to one or more constraints, for example a certificate for a configuration may only exists if all applicable software components are installed in a given order.

The radio device 1501 further includes a receiver 1506 configured to receive the response message 1509 from the regulation server 1502. In case that a reconfiguration is required in order to install the new software component (i.e. the software component to be installed), this reconfiguration may be executed automatically (e.g., all software components are reinstalled in a given specific order) or after consultation with the user of the radio device 1501. The user is for example consulted in case that the new software component can only be installed if a previously installed software component is removed. For example there may be a case that software for WiFi support is about to be installed on top of software for WiMAX support and for both software components there is a certificate if they are installed on their own. However there may not be a common certificate for having both the software for WiFi support and for WiMAX support installed simultaneously. In this case, the software component for WiFi support may only allowed by the server to be installed if the software component for WiMAX support is first removed.

The radio device 1501 includes a controller 1507 configured to configure the radio device 1501 in accordance with the response message 1509.

The response message 1509 received by the receiver 1506 may also include the order to forbid configurations that have been previously allowed (e.g., when moving across country borders, etc.). In this case, the configuration of the radio device 1501 is adapted by the controller 1507 adequately such that the radio device 1501 operates in accordance to regulatory requirements.

In the following, the operation of the identifier generator 1504, the transmitter 1505, the receiver 1506, and the controller 1507 are described in more detail for an example.

As an example, the case is considered that it is intended to install a new software component onto the reconfigurable radio device 1501, "having the potential to affect the compliance of radio equipment". In this case, the radio device 1501 performs the following:

i) The new software component is received and buffered without installing or executing new code. It is assumed in this example that the new software component is delivered with an identification that can identify the considered software component, including its version number and any other relevant information.

ii) The identifier generator 1504 calculates a checksum based on the received software component. Even though the "official" identification is delivered with the new software component a checksum is generated according to an embodiment to ensure that it may be detected whether the software component has been maliciously altered.

iii) The transmitter 1505 sends a request for the permission to install the new software component to the regulation server 1502 by means of the request message 1508. The transmitter includes information related to previously installed software components into the request message 1508. For example, information as given in table 1 may be delivered to the regulation server 1502 by the transmitter 1505.

TABLE 1

Information provided from the reconfigurable radio device 1501 to the regulation server 1502 in order to request certification information related to a software components that is intended to be installed.

| Request Message Content | Description |
|---|---|
| Software component certification request message ID | This defines the specific request to the regulation server. In particular, the given message ID indicates that the usage of a new certification component is requested. |
| Software component identification | This is the software component identification provided by the manufacturer of the software component that should be installed. |
| Checksum of software component | This is the checksum of the software component computed by the identifier generator 1504 (in order to detect any malicious alternation of the code) |
| Previously installed software component #1 | All previously installed software components are listed (which did undergo the some certification procedure) in the order of their installation |
| . . . | All previously installed software components are listed (which did undergo the some certification procedure) in the order of their installation |
| Previously installed software component #k | All previously installed software components are listed (which did undergo the some certification procedure) in the order of their installation |

Alternatively to the request for the permission to install a single software component, the permission to install multiple software components can be requested. For this purpose, for example, the information "software component identification" and "Checksum of software component" may be extended such that multiple identifications and checksum can be provided with the request message 1508. The software component certification request message ID may also be adapted adequately in order to indicate a request for the permission to install multiple software components.

The transmitter 1505 sends the request message 1507 (including for example the information listed in table 1) to the regulation server 1502. In other words, the radio device 1501 includes a second processing unit 1505 interacting with the regulation server 1502. The regulation server 1502 evaluates whether a certificate is available for the requested software component taking into account the previously installed software components. The regulation server 1502 then responds to the radio device 1501 by means of the response message 1509. For example, one of the following feed-back is sent back from the regulation server 1502 to the radio device 1501 by means of the response message 1509:

Unconditioned Approval: The radio device 1501 is permitted to install the new software component. In case that previously installed software components are present (for which the same procedure has been applied), the direct approval for example indicates that the new software component can be installed on top of the previously installed software components.

Rejection: The radio device 1501 is not allowed to install the new software component. This means that the software component needs to be abandoned by the radio device 1501.

Conditioned Approval: The radio device 1501 is permitted to install the new software component only if a set of conditions is met. For example, this concerns the order of installation of software components. By fixing the allowed installation order of software components, the number of tests can be minimized, since only one permutation of all possible permutations of the software components (with regard to installation order) needs to be certified. If permission to install in a installation order that is not certified is requested by the radio device 1501 the radio device 1501 is requested to reinstall all relevant software components in a specific order (as for example indicated in the response message 1509).

For example, the response message 1507 may include the information as indicated in table 2.

TABLE 2

Information provided from the regulation server to the reconfigurable radio device 1501 in answer to the request for permission to install a software component on the radio device 1501.

| Response Message Content | Description |
|---|---|
| Main answer to the request | Specifies an unconditioned approval, a conditioned approval or a rejection |
| In case of Conditioned Approval: Constraints | In case that a conditioned approval is granted, a list of conditions is communicated which need to be met by the radio device 1501 in order to be permitted to install the new software component. For example, these conditions relate to the installation order of software components, also previously installed ones. |

The receiver 1506 receives the response message 1509 from the regulation server 1502, e.g. with the contents as indicated in table 2.

The controller 1507 executes the installation (in case of an Unconditioned Approval or an Conditional Approval) depending on the type of the approval (Unconditioned/Conditioned).

The receiver 1506 may also receive an indication (e.g. from the regulation server 1502) that a previously permitted configuration is not permitted be used any more. This may for example be the case when the user of the radio device 1501 crosses the border to another country with a different regulatory regime. A configuration that is allowed by one regulatory regime may not be allowed by another regulatory regime. Thus, permission for the usage of a configuration may need to be requested by the regulation server 1502 even though it had previously been permitted, e.g. by another regulation server. In such a case, the information exchange may for example be as follows:

The user is entering a new regulatory regime with his radio device 1501. This is for example detected by a hand-over to another operator in the new country.

The local regulator requests information, e.g. by means of the regulation server 1502, about the software components installed on the radio device 1501.

The radio device 1501 lists installed software components and, in one embodiment, the corresponding certificates and signals the list to the regulation server 1502.

The regulation server 1502 may grant Unconditioned Approval, Conditioned Approval or Rejection as described above. Depending on the response, the radio device 1501 can continue using its current configuration (Unconditioned Approval) may eventually change some components (Conditioned Approval) or is not able to operate any more with its current configuration (Rejection). If the current configuration is rejected, the radio device 1501 may for example need to get an approval of all desired software components, e.g. as described above for a new software component to be installed.

In one embodiment, the checking whether use of the current (previously allowed) configuration is still permitted is triggered by the radio device 1501. The need to do so may for example be imposed onto the manufacturer. In this case, the radio device 1501 for example automatically checks the certificates of all installed software components with local regulatory entities (e.g. a local regulation server 1502) when a change of a country (or regulatory regime) is detected (e.g. after a hand-over).

The receiver 1506 and the controller 1507 can be seen as a third processing unit or processing circuit of the radio device 1501 that is performing the actual reconfiguration of the radio device 1501 based on the answer to the installation permission request from the regulation server 1502 and, in one embodiment, being informed about forbidden configurations that have been previously allowed.

As an example of the functionalities described above with reference to FIG. 15, a mobile device (or its user) desires to install a new software component after the sale of the device. The mechanisms described above with reference to FIG. 15 are provided by the platform manufacturer (i.e. device manufacturer) to have the radio device carry out steps in order to meet the requirements of the R&TTE Directive. Specifically, in one embodiment, the mobile device Calculates a checksum for the considered software component, taking the order and types of previously installed software components into account;

Interacts with a certification server in order to obtain the approval (or not) to install the desired software component. This certification server may grant an Unconditioned Approval, Conditioned Approval or Rejection.

Following an Unconditioned or Conditioned Approval by the certification server, the mobile device installs the new software component on top of the previously installed software components (in case of an Unconditioned Approval) or the mobile device installs the new software component following the constraints imposed by the certification server (typically requesting a certain installation order of all concerned software components).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio device, comprising:
   a reconfigurable component;
   an information transmitter configured to transmit information identifying the radio device and information about a certification associated with a configuration of the reconfigurable component to a permission determiner, wherein the certification indicates that the radio device has been authorized to use the configuration;
   a test case information receiver to receive, from the permission determiner based on the information identifying the radio device, information about a pre-determined test case, wherein the information about the pre-determined test case is transmitted by the permission determiner responsive to a determination that information indicating whether the radio device is permitted to use the configuration of the reconfigurable component is not stored in configuration storage; and
   a permission information receiver configured to receive, from the permission determiner, information indicating whether the radio device is permitted to use the configuration of the reconfigurable component.

2. The radio device of claim 1, further comprising:
   a radio circuit;
   wherein the reconfigurable component is configured to modify a property of the radio circuit.

3. The radio device of claim 1, wherein the reconfigurable component comprises at least one of: programmable logic, a field-programmable gate array, software, firmware, application software, software of a physical layer, software of a data link layer, software of a logical link control layer, or software of a media access control layer.

4. The radio device of claim 1, further comprising:
   a further reconfigurable component;
   wherein the information transmitter is further configured to transmit information about a certification associated with a configuration of the further reconfigurable component to the permission determiner; and
   wherein the permission information receiver is further configured to receive, from the permission determiner, information indicating whether the radio device is permitted to use the configuration of the reconfigurable component and the configuration of the further reconfigurable component.

5. The radio device of claim 1, further comprising:
   a test case evaluator configured to determine a result of the pre-determined test case using the configuration of the reconfigurable component.

6. The radio device of claim 1, wherein the information about the certification includes a certificate, a pointer to a certificate, or a declaration of conformity.

7. The radio device of claim 1, wherein the configuration is affected by a software component buffered in the radio device, without installing or executing the software component, prior to transmitting the information about the certification.

8. The radio device of claim 1, wherein the permission information receiver is further configured to receive, from the permission determiner, information to indicate whether the radio device is to use another configuration of the reconfigurable component that was previously used by the radio device and that is associated with a different certification.

9. A method to be performed by a radio device, the method comprising:
   transmitting information identifying the radio device and information about a certification associated with a configuration of a reconfigurable component of the radio device to a permission determiner, wherein the certification indicates that the radio device has been authorized to use the configuration;
   receiving, from the permission determiner based on the information identifying the radio device, information about a pre-determined test case, wherein the information about the pre-determined test case is transmitted by the permission determiner responsive to a determination that information indicating whether the radio device is permitted to use the configuration of the reconfigurable component is not stored in configuration storage; and receiving, from the permission determiner, information indicating whether the radio device is permitted to use the configuration of the reconfigurable component.

10. The method of claim 9, wherein the reconfigurable component comprises at least one of: programmable logic, a field-programmable gate array, software, firmware, application software, software of a physical layer, software of a data link layer, software of a logical link control layer, or software of a media access control layer.

11. The method of claim 9, further comprising:
determining a result of the pre-determined test case using the configuration of the reconfigurable component.

12. The method of claim 9, wherein the information about the certification includes a certificate, a pointer to a certificate, or a declaration of conformity.

13. The method of claim 9, wherein the configuration is affected by a software component buffered in the radio device prior to transmitting the information about the certification.

14. The method of claim 9, further comprising receiving, from the permission determiner, information indicating whether the radio device is to use another configuration of the reconfigurable component that was previously used by the radio device and that is associated with a different certification instead of using the configuration.

15. A regulation server, comprising:
a configuration information receiver configured to receive information identifying a radio device and information about a certification associated with a configuration of a reconfigurable component of the radio device, wherein the certification indicates that the radio device has been authorized to use the configuration;
a permission determiner configured to determine whether the radio device is permitted to use the configuration of the reconfigurable component based on the received information identifying the radio device and the received information about the certification associated with the configuration of the reconfigurable component of the radio device;
a permission information transmitter configured to transmit information indicating whether the radio device is permitted to use the configuration of the reconfigurable component; and
a test case information transmitter configured to transmit information about a pre-determined test case to the radio device;
wherein the test case information transmitter is configured to transmit the information about the pre-determined test case in case it is determined by the configuration information availability determiner that information indicating whether the radio device is permitted to use the configuration of the reconfigurable component is not stored in configuration storage.

16. The regulation server of claim 15, further comprising:
a configuration storage to store information about valid digital certifications and about invalid digital certifications; and
a configuration information availability determiner configured to determine whether the radio device is permitted to use the configuration of the reconfigurable component based on the information about the certification and the information stored in the configuration storage.

17. The regulation server of claim 15,
wherein the permission determiner is further configured to determine whether the radio device is permitted to use the configuration of the reconfigurable component based on a pre-determined test case, and wherein the regulation server further comprises:
a test case information transmitter configured to transmit information about the pre-determined test case to the radio device responsive to a determination that the configuration is unverified for a class of devices that includes the radio device; and
a test case result receiver configured to receive information about a result of the pre-determined test case from the radio device, wherein the pre-determined test case uses the configuration of the reconfigurable component.

18. The regulation server of claim 15, wherein the configuration is affected by a software component buffered in the radio device prior to transmitting the information about the certification.

19. The regulation server of claim 15, wherein the permission determiner is further configured to determine whether the radio device is to use another configuration of the reconfigurable component that was previously used by the radio device and that is associated with a different certification.

* * * * *